US012285943B2

(12) United States Patent
Hatano et al.

(10) Patent No.: US 12,285,943 B2
(45) Date of Patent: Apr. 29, 2025

(54) PRINTING SYSTEM AND DEFECTIVE NOZZLE DETECTION METHOD

(71) Applicant: SCREEN HOLDINGS CO., LTD., Kyoto (JP)

(72) Inventors: Keiji Hatano, Kyoto (JP); Satoru Kiyohara, Kyoto (JP); Yusaku Ikeda, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 154 days.

(21) Appl. No.: 18/159,324

(22) Filed: Jan. 25, 2023

(65) Prior Publication Data

US 2023/0278329 A1 Sep. 7, 2023

(30) Foreign Application Priority Data

Mar. 7, 2022 (JP) ................................ 2022-034059

(51) Int. Cl.
*B41J 2/045* (2006.01)

(52) U.S. Cl.
CPC ......... *B41J 2/0451* (2013.01); *B41J 2/04586* (2013.01)

(58) Field of Classification Search
CPC .... B41J 2/0451; B41J 2/04586; B41J 2/2139; B41J 2/2142; B41J 2/2146; B41J 2/16579; B41J 2/165
See application file for complete search history.

(56) References Cited

U.S. PATENT DOCUMENTS

| | | | |
|---|---|---|---|
| 2005/0030327 A1 | 2/2005 | Tatsumi | |
| 2013/0222455 A1 | 8/2013 | Wu et al. | |
| 2018/0086049 A1 | 3/2018 | Ueshima | |
| 2021/0001638 A1 | 1/2021 | Shibata | |

FOREIGN PATENT DOCUMENTS

| | | | |
|---|---|---|---|
| JP | 2005-067191 A | 3/2005 | |
| JP | 6945060 B2 | 10/2021 | |

*Primary Examiner* — Lisa Solomon

(74) *Attorney, Agent, or Firm* — Rimon P.C.

(57) ABSTRACT

A printing system including a printing unit and an imaging unit is provided with: a defect detection unit that detects a defect included in a captured image; a defective nozzle position candidate extraction unit that extracts N position candidates as candidates for a position of a defective nozzle based on the position of the defect; a first correction unit that performs a defect correction process; and a defective nozzle identification unit that identifies the defective nozzle. The first correction unit performs the defect correction process while sequentially setting only N nozzles corresponding to the N position candidates one by one as a correction target nozzle. The defective nozzle identification unit identifies the defective nozzle based on the position of the defect detected by the defect detection unit based on the corrected image.

20 Claims, 21 Drawing Sheets

DEFECT LIST

| COORDINATES | LENGTH |
|---|---|
| ... | ... |
| ... | ... |

Fig.19

| | TARGET COLOR | R | G | B | DETERMINATION |
|---|---|---|---|---|---|
| 76 | CMYK | ○ | ○ | ○ | K |
| | | ○ | ○ | | X |
| 78 | | | ○ | ○ | X |
| | | ○ | | ○ | X |
| | | ○ | | | C |
| 79 | | | ○ | | M |
| | | | | ○ | Y |
| | CMY | ○ | ○ | ○ | X |
| | | ○ | ○ | | X |
| | | | ○ | ○ | X |
| | | ○ | | ○ | X |
| | | ○ | | | C |
| 77 | | | ○ | | M |
| | | | | ○ | Y |
| | CMK | ○ | ○ | — | K |
| | | ○ | | — | C |
| | | | ○ | — | M |
| | | | | — | — |
| | CYK | ○ | — | ○ | K |
| | | ○ | — | | C |
| | | | — | ○ | Y |
| | | | — | | — |
| | MYK | — | ○ | ○ | K |
| | | — | ○ | | M |
| | | — | | ○ | Y |
| | | — | | | — |

| TARGET COLOR | R | G | B | DETERMINATION |
|---|---|---|---|---|
| CM | ○ | ○ | — | X |
| | ○ | | — | C |
| | | ○ | — | M |
| | | | — | — |
| CY | ○ | — | ○ | X |
| | ○ | — | | C |
| | | — | ○ | Y |
| | | — | | — |
| MY | — | ○ | ○ | X |
| | — | ○ | | M |
| | — | | ○ | Y |
| | — | | | — |
| CK | ○ | — | ○ | K |
| | ○ | — | | C |
| | | — | — | K |
| MK | ○ | ○ | — | K |
| | | ○ | — | M |
| | — | | — | K |
| YK | — | ○ | ○ | K |
| | — | | ○ | Y |
| | — | — | | K |

73 74 75

PRINTING SYSTEM AND DEFECTIVE NOZZLE DETECTION METHOD

BACKGROUND OF THE INVENTION

Field of the Invention

The present invention relates to a printing system including a printing mechanism having a print head provided with a large number of nozzles for ejecting ink and an image inspection device for inspecting an image after printing, and particularly relates to a method for detecting a nozzle in an ejection failure state from a large number of nozzles.

Description of Related Art

There has been known an inkjet printer that performs printing by ejecting ink onto a base material (printing medium) such as print paper. In the inkjet printer, when the ejection interval is long, drying of the ink due to evaporation of solvent near the nozzle, mixing of air bubbles into the nozzle, adhesion of dust to the nozzle, and the like may occur during the period of printing. That is, ink ejection failure may occur. When ink ejection failure occurs, in the print image, lack of dots corresponding to a nozzle in an ejection failure state (hereinafter referred to as a “defective nozzle”) occurs, that is, dot missing occurs. In this case, an operation (cleaning or flushing) for restoring the function of the defective nozzle, and an alternative droplet for causing another nozzle to eject ink droplets to be ejected by the defective nozzle are performed.

In an inkjet printer having a print head (inkjet head) in which a large number of nozzles as recording elements are arranged in a width direction of a base material (a direction perpendicular to the conveyance direction of the base material), it is necessary to detect an ejection failure and identify a defective nozzle in order to prevent dot missing caused by the ejection failure as described above. In this regard, conventionally, a defective nozzle has been identified based on a print result of a page image including only a nozzle check pattern or a print result of an image obtained by adding a nozzle check pattern to a region outside an original print area for a plurality of pages.

However, according to the technique of identifying the defective nozzle based on the print result of the page image including only the nozzle check pattern, the page for nozzle check pattern printing is inserted between a large number of pages required by a user, and hence the need arises to remove the page for nozzle check pattern printing in the later process. According to the technique of identifying the defective nozzle based on the print result of the image obtained by adding the nozzle check pattern to the region outside the original print area for the plurality of pages, a process needs to be performed on many pages in order to inspect all the nozzles provided in the inkjet printer, and the original print area that can be used by the user becomes small by providing the region for the nozzle check pattern.

Therefore, Japanese Patent No. 6945060 discloses an invention of an abnormal nozzle detection method for identifying an abnormal nozzle (defective nozzle) from a print result of a user image in which an abnormal nozzle identification pattern not visible by a user is embedded. According to the abnormal nozzle detection method, the partial regions in the user image are associated with the nozzles, and correction is performed assuming that the nozzle associated with each partial region is abnormal. Then, the streak information is detected based on the print result of the corrected image, and the state of the nozzle is estimated based on the streak information. In this manner, the defective nozzle is identified from a single image without an increase in the amount of waste paper. Note that Japanese Laid-Open Patent Publication No. 2005-067191 discloses a technique of detecting an inappropriate nozzle (defective nozzle) for each of a K-ink nozzle, a C-ink nozzle, an M-ink nozzle, and a Y-ink nozzle using RGB values obtained by capturing a print image.

However, according to the invention disclosed in Japanese Patent No. 6945060, the entire region of the user image is divided into a plurality of partial regions, and all nozzles are associated with the respective partial regions one by one. Then, in all the partial regions, a correction process is performed assuming that the associated nozzle is a defective nozzle. Thus, process efficiency is significantly poor. In addition, defect detection in a partial region in a single user image (a user image for one page) is targeted, and defect detection in a plurality of pages or different patterns is not assumed. Further, no specific technique for determining partial regions is disclosed.

SUMMARY OF THE INVENTION

In view of the above circumstances, an object of the present invention is to provide a printing system and a defective nozzle detection method capable of efficiently detecting a defective nozzle from a large number of nozzles.

One aspect of the present invention is directed to a printing system including:

a printing unit that has a plurality of nozzles and is configured to perform printing on a print medium by ejecting ink from each of the plurality of nozzles;

an imaging unit configured to capture a print image printed on the print medium by the printing unit;

a defect detection unit configured to perform an inspection process for detecting a defect included in a captured image obtained by capturing the print image by the imaging unit;

a defective nozzle position candidate extraction unit configured to extract N position candidates, N being an integer of 2 or more, from positions of the plurality of nozzles as candidates for a position of a defective nozzle that is a nozzle having an ejection defect, based on a position of the defect detected by the inspection process in the captured image;

a defect correction unit configured to perform, on a user image, a defect correction process for removing an influence of an ejection defect of a nozzle set as a correction target nozzle to generate a corrected image, the user image being an image to be printed; and a defective nozzle identification unit configured to identify the defective nozzle from N nozzles respectively corresponding to the N position candidates, wherein after the printing by the printing unit, the capturing of the print image by the imaging unit, and the inspection process by the defect detection unit are performed based on the user image, the N position candidates are extracted by the defective nozzle position candidate extraction unit, the defect correction unit performs the defect correction process while sequentially setting each of only the N nozzles among the plurality of nozzles as the correction target nozzle one by one, after the corrected image is generated by the defect correction unit, the printing by the printing unit, the capturing of the print image by the imaging unit, and the inspection process by the defect detection unit are performed based on the corrected image, and the defective nozzle identification unit identifies the defective nozzle based on a position of the defect detected by the inspection process performed based on the corrected image, in the captured image.

With such a configuration, N (N is an integer of 2 or more) position candidates are extracted as candidates for the position of the defective nozzle on the basis of the position of the defect detected in the inspection process based on the captured image obtained by capturing the print image of the user image. Then, a defect correction process (a process for removing the influence of the ejection defect of the nozzle set as the correction target nozzle) is performed while sequentially setting only N nozzles respectively corresponding to the N position candidates one by one as the correction target nozzles. Thereafter, the defective nozzle is identified on the basis of the position of the defect detected by the inspection process based on the captured image obtained by the capturing of the corrected image (the image after the defect correction process). As above, only the N (e.g., four) nozzles respectively corresponding to the N position candidates among the plurality of nozzles provided in the printing system are set as the correction target nozzles at the time of the defect correction process. In addition, it is possible to identify the defective nozzle without printing a special image such as a nozzle check pattern. From the above, a printing system capable of efficiently detecting a defective nozzle from a large number of nozzles is achieved.

Another aspect of the present invention is directed to a defective nozzle detection method in a printing system including a printing unit that has a plurality of nozzles and performs printing on a print medium by ejecting ink from each of the plurality of nozzles, and an imaging unit that captures a print image printed on the print medium by the printing unit, the defective nozzle detection method including:

a first printing step of printing a user image by the printing unit;

a first imaging step of imaging a print image obtained in the first printing step;

a first defect detection step of detecting a defect included in a first captured image obtained in the first imaging step;

a defective nozzle position candidate extraction step of extracting N position candidates, N being an integer of 2 or more, from positions of the plurality of nozzles as candidates for a position of a defective nozzle that is a nozzle having an ejection defect, based on a position of the defect detected in the first defect detection step in the first captured image;

a defect correction step of performing, on the user image, a defect correction process for removing an influence of an ejection defect of a nozzle set as a correction target nozzle to generate a corrected image;

a second printing step of printing the corrected image by the printing unit;

a second imaging step of imaging a print image obtained in the second printing step;

a second defect detection step of detecting a defect included in a second captured image obtained in the second imaging step; and a defective nozzle identification step of identifying the defective nozzle from N nozzles respectively corresponding to the N position candidates based on a position of the defect detected in the second defect detection step in the second captured image, wherein in the defect correction step, the defect correction process is performed while sequentially setting each of only the N nozzles among the plurality of nozzles as the correction target nozzle one by one.

These and other objects, features, modes, and advantageous effects of the present invention will become more apparent from the following detailed description of the present invention with reference to the accompanying drawings.

BRIEF DESCRIPTION OF THE DRAWINGS

FIG. 19 is a diagram for describing a defect color determination table in the embodiment;

DETAILED DESCRIPTION OF PREFERRED EMBODIMENT

An embodiment of the present invention will be described below with reference to the accompanying drawings.

<1. Overall Configuration of Printing System>

Figure 1:
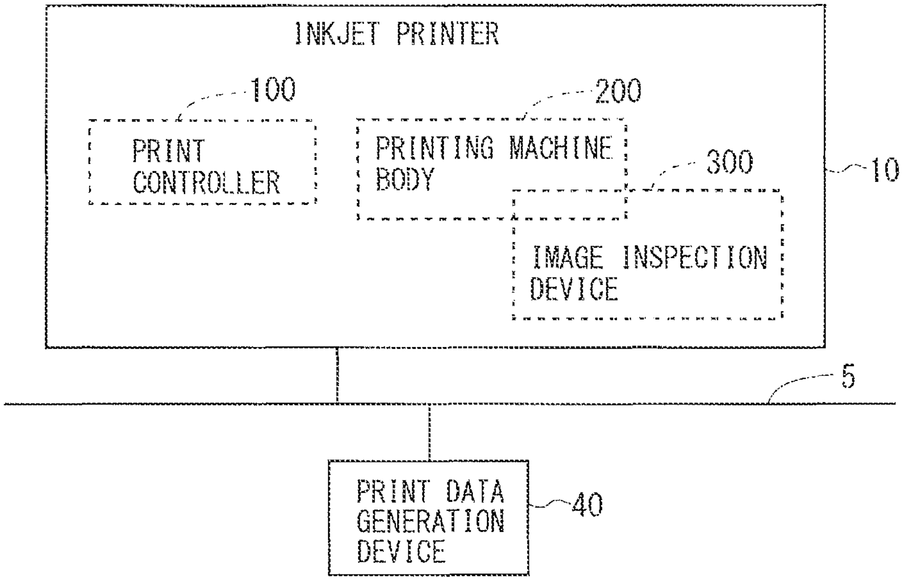
FIG. 1 is an overall configuration diagram of a printing system according to an embodiment of the present invention.

FIG. 1 is an overall configuration diagram of a printing system according to an embodiment of the present invention. The printing system is includes an inkjet printer 10 and a print data generation device 40. The inkjet printer 10 and the print data generation device 40 are connected to each other through a communication line 5. The print data generation device 40 generates print data by performing a raster image processor (RIP) process or the like on submitted data such as a portable document format (PDF) file. The print data generated by the print data generation device 40 is transmitted to the inkjet printer 10 through the communication line 5. The inkjet printer 10 outputs a print image to print paper as a print medium based on print data transmitted from the print data generation device 40 without using a printing plate. The inkjet printer 10 includes a printing machine body 200, a print controller 100 for controlling the operation of the printing machine body 200, and an image inspection device 300 for inspecting a printing state. That is, the inkjet printer 10 is a printer with an inspection function. Some components of the image inspection device 300 are incorporated in the printing machine body 200.

Although the image inspection device 300 is a component of the inkjet printer 10 (i.e., the image inspection device 300 is included in the inkjet printer 10) in the configuration shown in FIG. 1, the present invention is not limited thereto. The image inspection device 300 may be a single apparatus independent of the inkjet printer 10.

<2. Configuration of Inkjet Printer>

Figure 2:
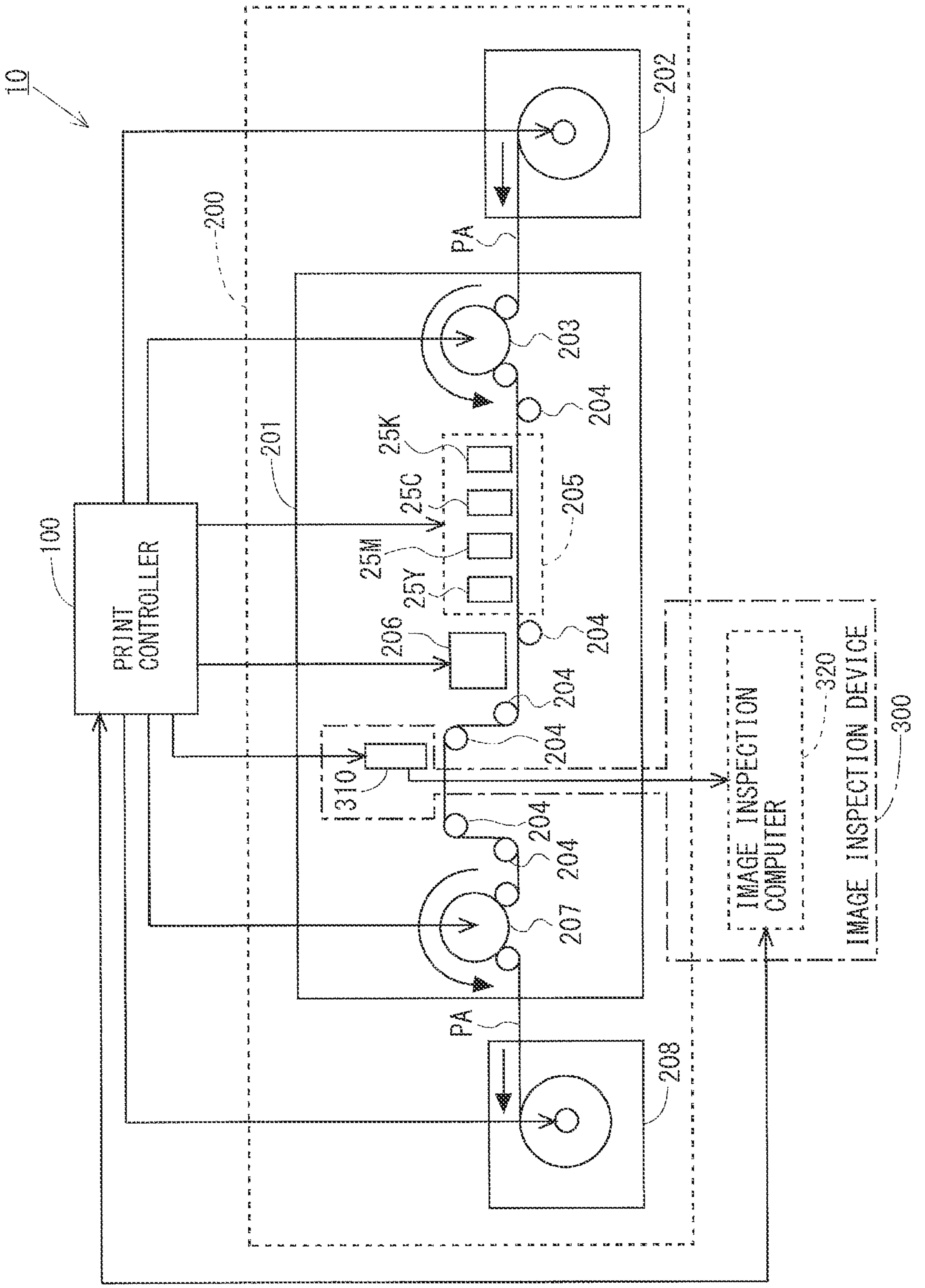
FIG. 2 is a schematic diagram showing a configuration example of an inkjet printer according to the embodiment.

FIG. 2 is a schematic diagram showing a configuration example of the inkjet printer 10. As described above, the inkjet printer 10 includes the print controller 100, the printing machine body 200, and the image inspection device 300. The printing machine body 200 includes a paper feeding unit 202 that supplies print paper (e.g., roll paper) PA, a printing mechanism 201 that performs printing on print paper PA, and a paper winding unit 208 that winds the print paper PA after printing. The printing mechanism 201 includes a first driving roller 203 that conveys the print paper PA to the inside, a plurality of support rollers 204 for conveying the print paper PA inside the printing mechanism 201, a printing unit 205 that performs printing by ejecting ink onto the print paper PA, a drying unit 206 that dries the printed print paper PA, and a second driving roller 207 that outputs the print paper PA from the inside of the printing mechanism 201.

The first driving roller 203, the plurality of support rollers 204, and the second driving roller 207 constitute a conveyance mechanism for conveying the print paper PA. The printing unit 205 includes print heads 25K, 25C, 25M, and 25Y that respectively eject black (K color), cyan (C color), magenta (M color), and yellow (Y color) inks. The printing mechanism 201 also includes an imaging unit 310 that captures a print image formed on the print paper PA by the printing unit 205. The imaging unit 310 is a component of the image inspection device 300 and is configured using an image sensor such as a charged coupled device (CCD) or a complementary metal-oxide semiconductor (CMOS).

The print controller 100 controls the operation of the printing machine body 200 having the configuration as above. When an instruction command for printing output is given to the print controller 100, the print controller 100 controls the operation of the printing machine body 200 so that the print paper PA is conveyed from the paper feeding unit 202 to the paper winding unit 208. Then, first, the printing unit 205 performs printing on the print paper PA based on the print data transmitted from the print data generation device 40. Next, the drying unit 206 dries the print paper PA. Finally, the imaging unit 310 captures an image of the print image.

The image inspection device 300 is constituted by the imaging unit 310 and an image inspection computer 320. The captured image obtained by capturing the print image with the imaging unit 310 is sent to the image inspection computer 320. As described later, the image inspection computer 320 performs a series of processing to detect a defect and identify a defective nozzle. At that time, data necessary for performing the processing is exchanged between the print controller 100 and the image inspection device 300.

Figure 3:
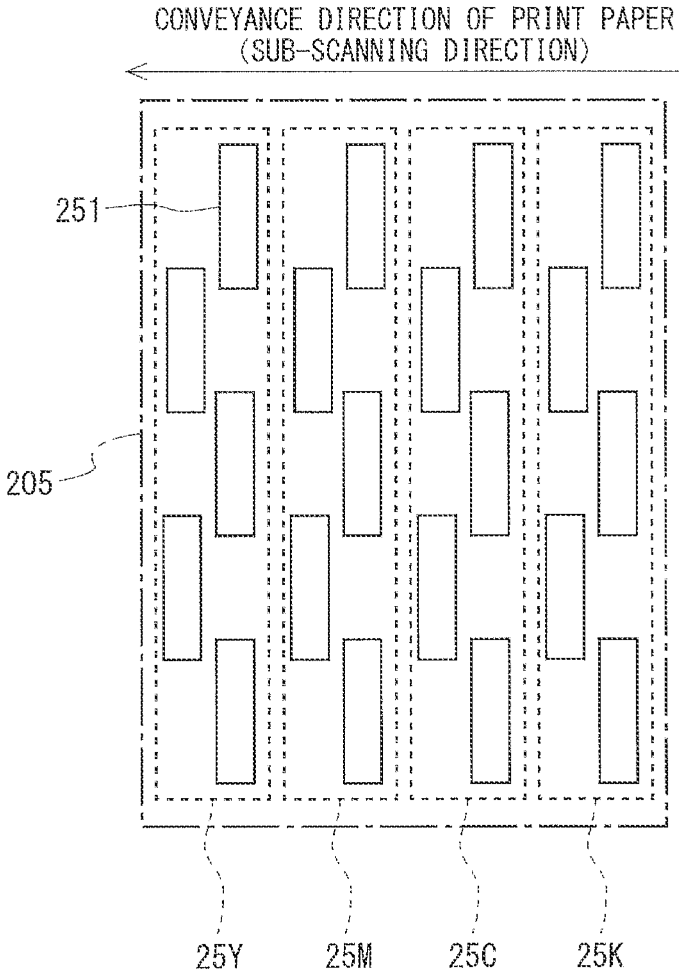
FIG. 3 is a plan view showing a configuration example of a printing unit in the embodiment.

FIG. 3 is a plan view showing a configuration example of the printing unit 205. As shown in FIG. 3, the printing unit 205 includes the black, cyan, magenta, and yellow print heads (ink ejection units) 25K, 25C, 25M, and 25Y arranged in a row in the conveyance direction of the print paper PA (sub-scanning direction). Each print head 25 includes a plurality of head modules 251 arranged in a staggered manner.

Figure 4:
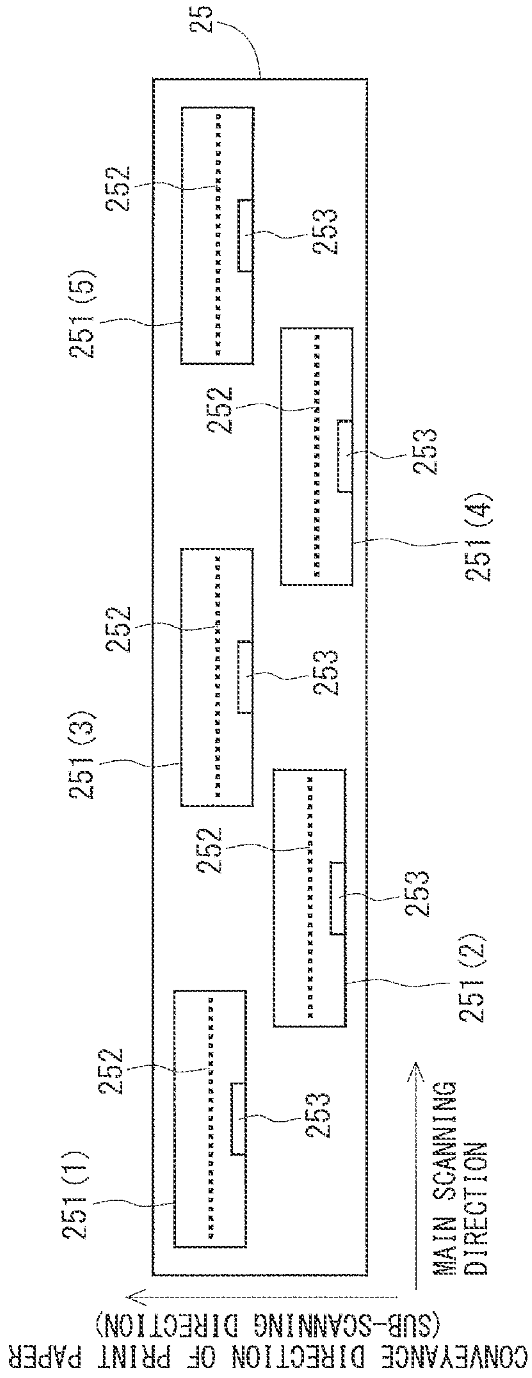
FIG. 4 is a plan view showing a configuration example of one print head in the embodiment.

FIG. 4 is a plan view showing a configuration example of one print head 25. As shown in FIG. 4, the print head 25 includes a plurality of head modules 251. Each head module 251 includes a plurality of nozzles 252 at least in the main scanning direction. Each head module 251 incorporates a head memory 253. The head memory 253 stores the unique information regarding the head module 251.

In the example shown in FIG. 4, the print head 25 includes five head modules 251(1) to 251(5). The head module 251(1) is disposed on the downstream side in the conveyance direction of the print paper PA and on the leftmost side in the main scanning direction. The head module 251(5) is disposed on the downstream side in the conveyance direction of the print paper PA and on the rightmost side in the main scanning direction. The head module 251(3) is disposed between the head module 251(1) and the head module 251(5). The head module 251(2) and the head module 251(4) are disposed on the upstream side in the conveyance direction of the print paper PA such that the five head modules 251(1) to 251(5) are arranged in a staggered arrangement.

<3. Hardware Configuration of Computer>

Figure 5:
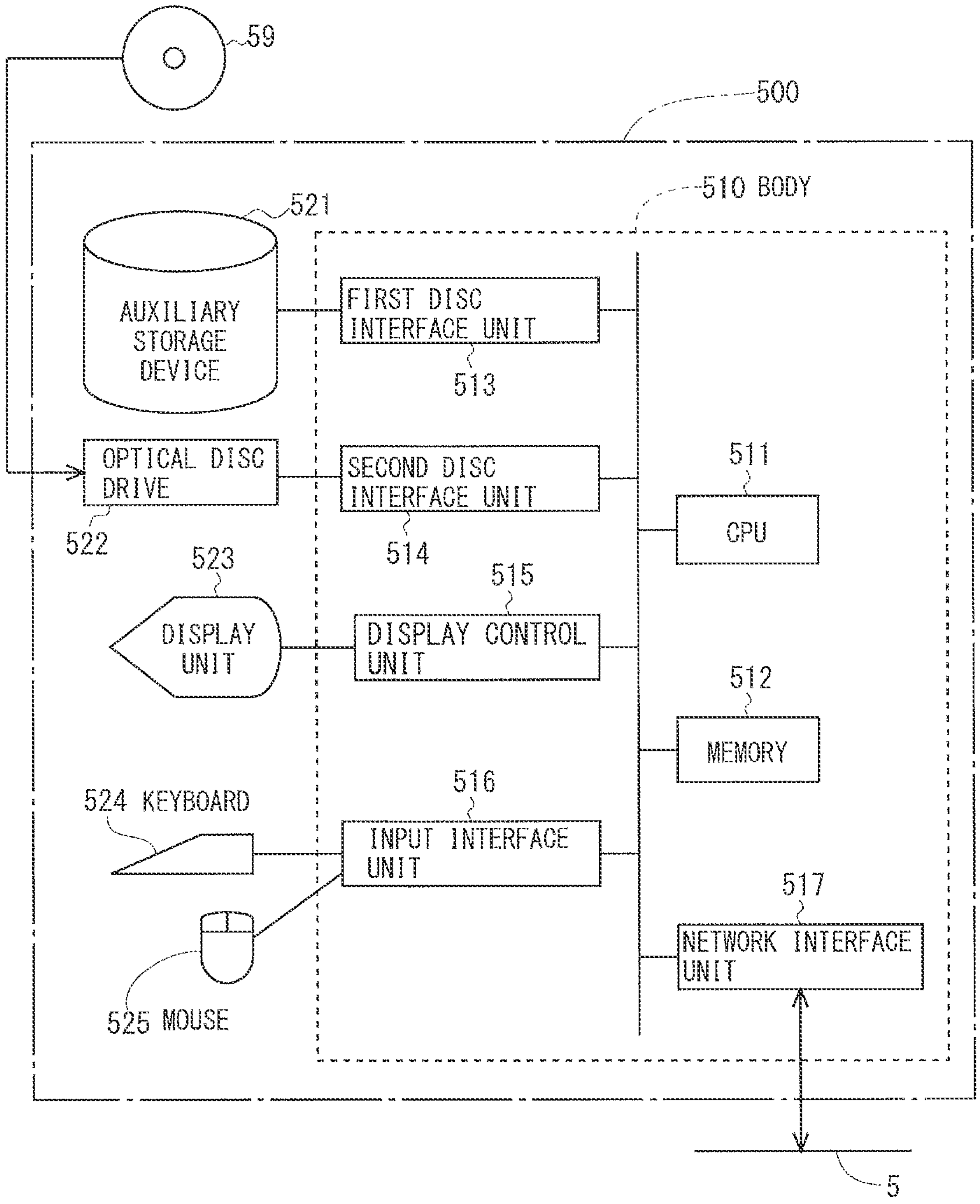
FIG. 5 is a block diagram showing a configuration of a computer included in the printing system according to the embodiment.

FIG. 5 is a block diagram showing a configuration of a computer 500 included in the printing system according to the present embodiment. The computer 500 is included in each of the print controller 100, the image inspection device 300, and the print data generation device 40. Note that the computer 500 included in the image inspection device 300 is the image inspection computer 320.

The computer 500 shown in FIG. 5 includes a body 510, an auxiliary storage device 521, an optical disc drive 522, a display unit 523, a keyboard 524, a mouse 525, and the like. The body 510 includes a central processing unit (CPU) 511, a memory 512, a first disc interface unit 513, a second disc interface unit 514, a display control unit 515, an input interface unit 516, and a network interface unit 517. The CPU 511, the memory 512, the first disc interface unit 513, the second disc interface unit 514, the display control unit 515, the input interface unit 516, and the network interface unit 517 are connected to each other through a system bus. The auxiliary storage device 521 is connected to the first disc interface unit 513. The auxiliary storage device 521 is a magnetic disc device or the like. The optical disc drive 522 is connected to the second disc interface unit 514. An optical disc 59 as a computer-readable recording medium such as a compact disc read-only memory (CD-ROM) or a digital versatile disc (DVD)-ROM is inserted into the optical disc drive 522. The display unit (display device) 523 is connected to the display control unit 515. The display unit 523 is a liquid crystal display or the like. The display unit 523 is used to display information desired by an operator. The keyboard 524 and the mouse 525 are connected to the input interface unit 516. The keyboard 524 and the mouse 525 are used by the operator to input instructions to the computer 500. The network interface unit 517 is an interface circuit for wired communication or wireless communication and is connected to the communication line 5.

The auxiliary storage device 521 stores a program to be executed by the computer 500. The CPU 511 reads a program stored in the auxiliary storage device 521 into the memory 512 and executes the program to achieve various functions. The memory 512 includes random-access memory (RAM) and read-only memory (ROM). The memory 512 functions as a work area for the CPU 511 to execute the program stored in the auxiliary storage device 521. Note that the program is provided by being stored into the computer-readable recording medium (non-transitory recording medium), for example.

<4. Outline of Identification of Defective Nozzle>

Figure 6:
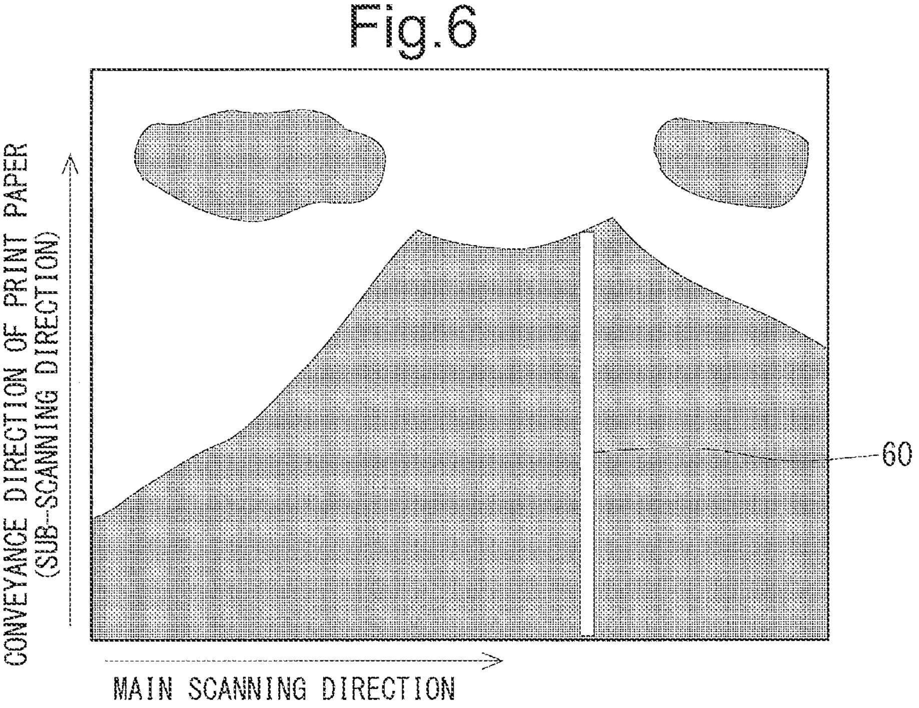
FIG. 6 is a diagram for describing an outline of identification of a defective nozzle in the embodiment.

An outline of how to identify a defective nozzle (a nozzle in an ejection failure state) in the present embodiment will be described with reference to FIGS. 6 to 8. Here, an example is given of a case where a streak defect denoted by reference numeral 60 in FIG. 6 is detected by an inspection process to detect a defect (a defect in the print image) by the image inspection device 300. Hereinafter, a process for correcting the image based on the print data while setting the nozzle that is assumed to have caused the streak defect as a correction target nozzle so as to obtain the print image obtained by removing the influence of the ejection defect of the correction target nozzle is referred to as a "defect correction process".

First, a candidate for a nozzle having caused the streak defect 60 (hereinafter referred to as a "defective nozzle candidate") is extracted based on the position (coordinates in the main scanning direction) of the streak defect 60. The resolution of the captured image is lower than the resolution of the print image, and hence, for example, four nozzles are extracted as defective nozzle candidates. Meanwhile, a certain nozzle and another nozzle are identified based on the placement positions thereof. Therefore, for example, four positions are extracted as position candidates (candidates for the placement position of the nozzle having caused the streak defect 60). When the four positions are extracted as position candidates, the region in which the streak defect 60 has occurred is divided into four partial regions 61 to 64 as shown in FIG. 7. Here, for convenience of description, the four nozzles extracted as the defective nozzle candidates are referred to as a "first nozzle", a "second nozzle", a "third nozzle", and a "fourth nozzle". The defect correction process is performed with the first nozzle set as the correction target nozzle for the partial region 61, the defect correction process is performed with the second nozzle set as the correction target nozzle for the partial region 62, the defect correction process is performed with the third nozzle set as the correction target nozzle for the partial region 63, and the defect correction process is performed with the fourth nozzle set as the correction target nozzle for the partial region 64. Then, it is assumed that a print result as shown in FIG. 8 is obtained after the defect correction process. According to the print result shown in FIG. 8, the streak defect remains in the partial regions 61, 62, and 64, but the streak defect has been resolved in the partial region 63. At this time, in the inspection process after the defect correction process, the streak defect is detected for the partial regions 61, 62, and 64, but the streak defect is not detected for the partial region 63. In this regard, the streak defect is not resolved when the defect correction process is performed with the nozzle that has not caused the streak defect set as the correction target nozzle, but the streak defect is resolved when the defect correction process is performed with the nozzle that has caused the streak defect set as the correction target nozzle. Therefore, in the example shown in FIG. 8, the third nozzle is identified as the defective nozzle that has actually caused the streak defect, based on the result of the inspection process after the defect correction process.

Although a defect (e.g., ink dripping) caused by an event different from the ejection failure of the nozzle is also detected in the inspection process by the image inspection device 300, only the streak defect is focused on in the present embodiment. In the following, a process mainly performed by the image inspection computer 320 and the print controller 100 to identify a defective nozzle from among the plurality of nozzles provided in the printing unit 205 is referred to as a "defective nozzle detection process".

<5. Functional Configuration>

Figure 9:
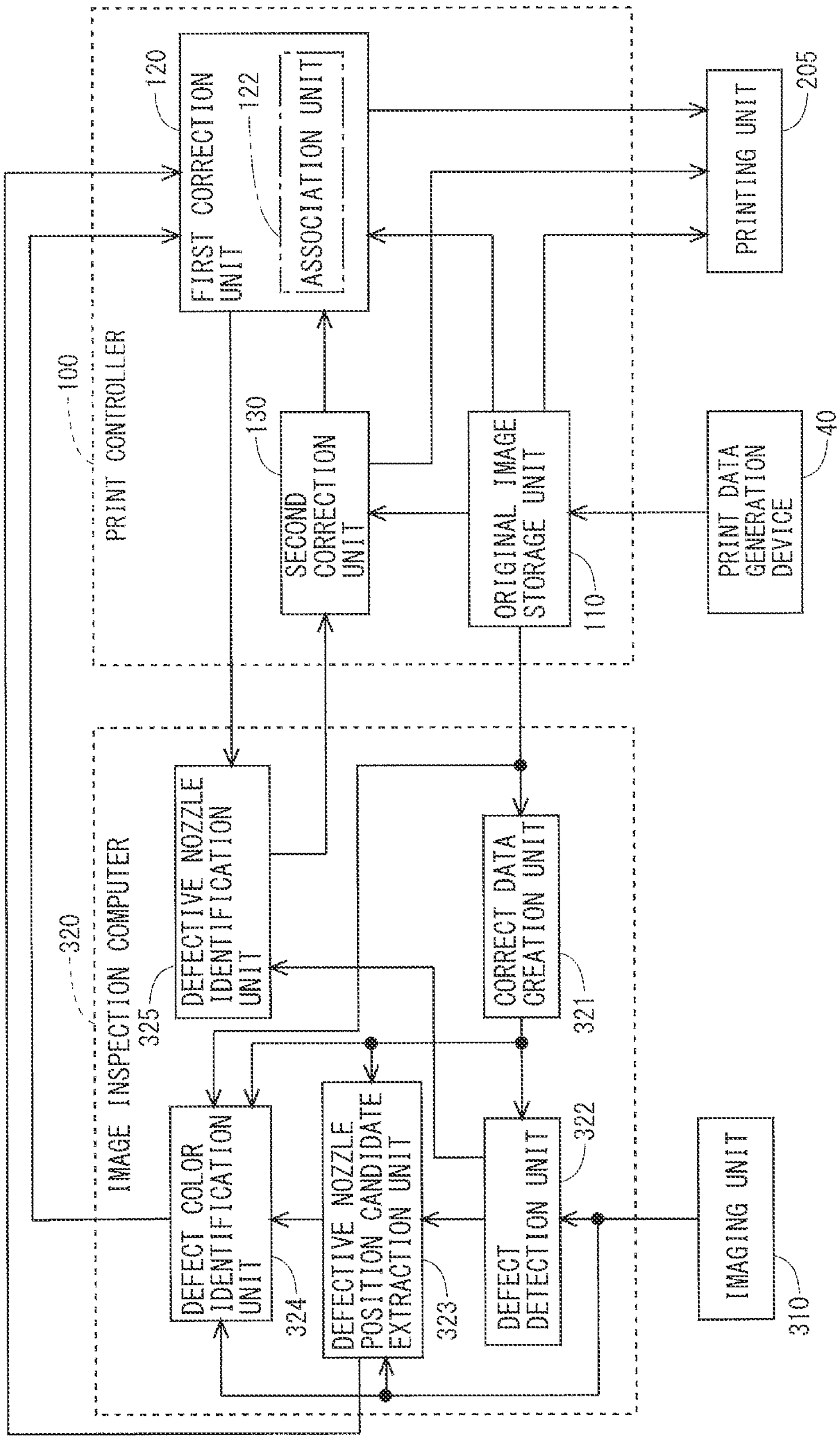
FIG. 9 is a functional block diagram showing a functional configuration related to a defective nozzle detection process in the embodiment.

FIG. 9 is a functional block diagram showing a functional configuration related to the defective nozzle detection process in the present embodiment. The print controller 100 is provided with an original image storage unit 110, a first correction unit 120, and a second correction unit 130 as functional components related to the defective nozzle detection process. The image inspection computer 320 is provided with a correct data creation unit 321, a defect detection unit 322, a defective nozzle position candidate extraction unit 323, a defect color identification unit 324, and a defective nozzle identification unit 325 as functional components related to the defective nozzle detection process. Hereinafter, the operation of each component will be described along the flow of the defective nozzle detection process.

The original image storage unit 110 stores a user image that is an image to be printed. This user image is an image before being subjected to a halftone process and corresponds to print data transmitted from the print data generation device 40. Here, the "user image" refers to, for example, an image specified by the user for printing an image desired by a user and is synonymous with a "real image" such as a product image that the user desires to print or a test image for test printing of the product image in advance.

The user image stored in the original image storage unit 110 is provided from the print controller 100 to the correct data creation unit 321. Then, the correct data creation unit 321 creates a correct image in RGB format from the user image in CMYK format.

The defect detection unit 322 performs an inspection process for detecting a defect included in a captured image obtained by capturing a print image by the imaging unit 310. This inspection process is performed by comparing the captured image with the correct image created by the correct data creation unit 321. In this regard, with the captured image being RGB format data, the correct image in the RGB format is created by the correct data creation unit 321 as described above. Note that the inspection process by the defect detection unit 322 is also performed by comparing the captured image of the print image based on the user image with the correct image, or is also performed by comparing the captured image of the print image based on a corrected image to be described later with the correct image.

While referring to the captured image and the correct image, the defective nozzle position candidate extraction unit 323 extracts a candidate for the position (position candidate) of the defective nozzle from the positions of the plurality of nozzles provided in the printing unit 205 based on the position (the position in the captured image: coordinates in the main scanning direction) of the defect detected in the inspection process by the defect detection unit 322. In the present embodiment, the defective nozzle position candidate extraction unit 323 extracts N position candidates (N is an integer of 2 or more). In other words, the defective nozzle position candidate extraction unit 323 extracts N nozzles as defective nozzle candidates from among the plurality of nozzles provided in the printing unit 205.

The defect color identification unit 324 identifies a color of ink ejected by a print head that includes a defective nozzle among the black print head 25K, the cyan print head 25C, the magenta print head 25M, and the yellow print head 25Y. Schematically, the defect color identification unit 324 identifies a color on the basis of a difference in average values of R (red) color values, a difference in average values of G (green) color values, and an average value of B (blue) color values in a region where a defect is detected by the inspection process performed on the basis of the user image, between a captured image based on the user image and a correct image corresponding to the user image. At that time, the defect color identification unit 324 narrows down the color based on the data of a portion corresponding to the N position candidates in the user image, and further identifies the color based on the data of the portion corresponding to the N position candidates in the captured image and the correct image. Hereinafter, the color identified by the defect color identification unit 324 is referred to as a "defect color".

The information on the position candidate extracted by the defective nozzle position candidate extraction unit 323 and the information on the defect color identified by the defect color identification unit 324 are provided from the image inspection computer 320 to the first correction unit 120. Then, the first correction unit 120 generates the corrected image by performing the defect correction process described above on the user image while sequentially setting only the N nozzles (the nozzles extracted as the defective nozzle candidates by the defective nozzle position candidate extraction unit 323) among the plurality of nozzles provided in the printing unit 205 as the correction target nozzles one by one based on the information on the position candidate and the information on the defect color. After the defective nozzle corresponding to a certain streak defect is identified, an image (corrected user image) obtained by the second correction unit 130 performing the defect correction process (the defect correction process for removing the influence of the ejection defect of the defective nozzle) on the user image is provided to the first correction unit 120, and the first correction unit 120 performs the defect correction process on the corrected user image to generate a corrected image.

The first correction unit 120 includes an association unit 122. The association unit 122 associates N nozzles as defective nozzle candidates with N partial regions included in the user image. At that time, N partial regions are set such that each partial region includes the position of the defect detected by the inspection process performed by comparing the captured image of the print image based on the user image with the correct image. The defect correction process by the first correction unit 120 is performed by setting a different nozzle among the N nozzles as the correction target nozzle for each of the N partial regions.

Correction position information indicating which nozzle has been set as the correction target nozzle at which position (region) in performing the defect correction process is provided from the print controller 100 to the defective nozzle identification unit 325. Then, the defective nozzle identification unit 325 identifies the defective nozzle on the basis of the position (the position in the captured image: coordinates in the main scanning direction) of the defect detected in the inspection process performed by comparing the captured image of the print image based on the corrected image with the correct image, and the correction position information.

The information on the defective nozzle identified by the defective nozzle identification unit 325 is provided from the image inspection computer 320 to the second correction unit 130. Then, the second correction unit 130 performs the defect correction process on the user image so as to obtain a print image from which the influence of the ejection defect of the defective nozzle has been removed. As a result, the corrected user image described above is obtained. After all the defective nozzles are identified, printing is performed by the printing unit 205 based on the corrected user image generated by the second correction unit 130.

Meanwhile, as described above, the user image stored in the original image storage unit 110 is an image before being subjected to the halftone process. Therefore, the print controller 100 is also provided with a component for performing the halftone process so that the image data after the halftone process is provided to the printing unit 205. However, this component is omitted in FIG. 9.

<6. Process Procedure>

Hereinafter, the procedure of the defective nozzle detection process will be described.

<6.1 Schematic Procedure>

Figure 10:
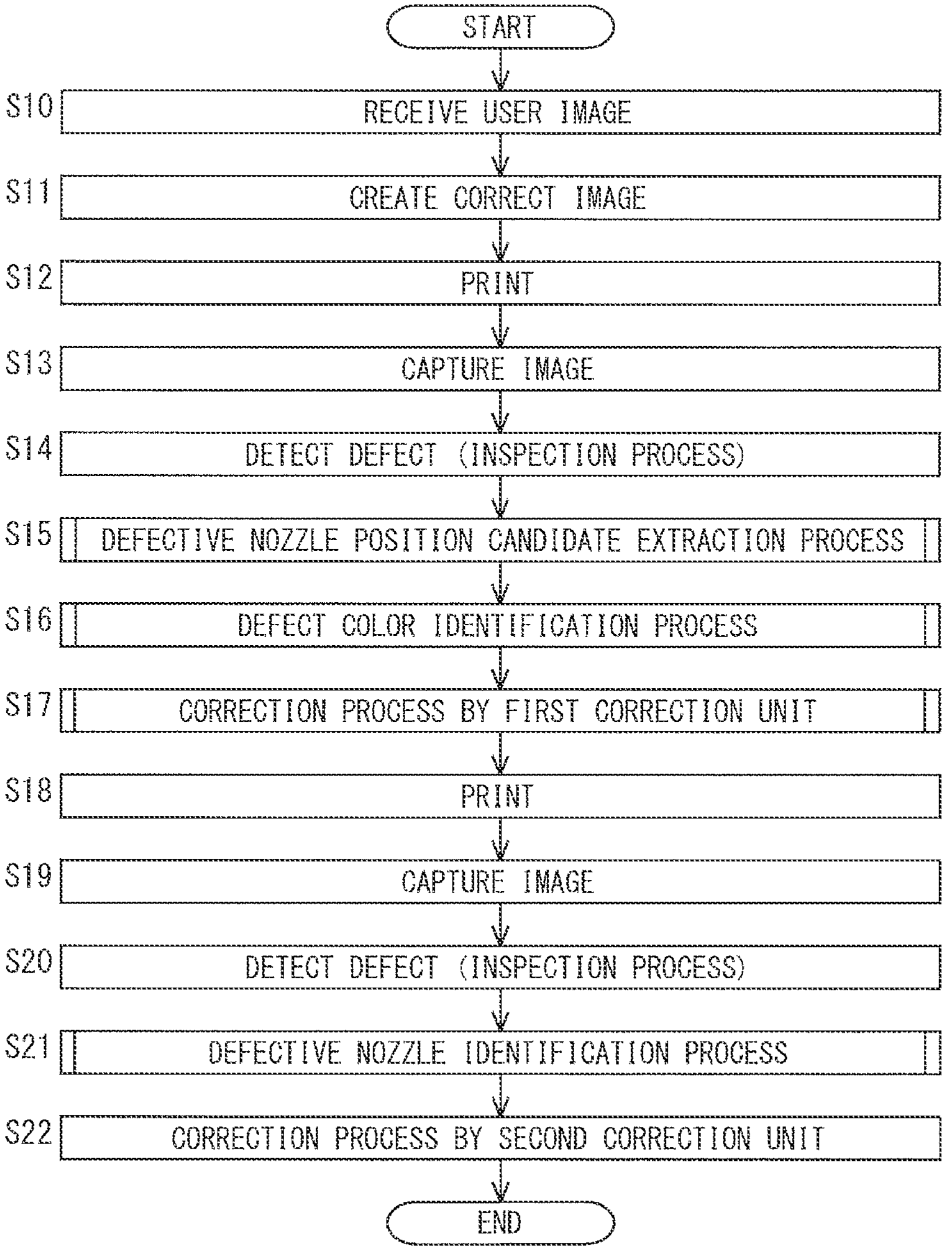
FIG. 10 is a flowchart showing a schematic procedure of the defective nozzle detection process in the embodiment.

FIG. 10 is a flowchart showing a schematic procedure of the defective nozzle detection process. This defective nozzle detection process is performed repeatedly, and hence the procedure described here is a procedure of a process for one page.

First, the print controller 100 receives the user image transmitted from the print data generation device 40 (step S10). The user image is stored in the original image storage unit 110. Next, the user image stored in the original image storage unit 110 is transmitted from the print controller 100 to the image inspection computer 320, and a correct image is created from the user image by the correct data creation unit 321 (step S11).

Next, printing by the printing unit 205 is performed based on the user image stored in the original image storage unit 110 (step S12). Then, the print image obtained in step S12 is captured by the imaging unit 310 (step S13). Next, the defect detection unit 322 performs an inspection process for detecting a defect included in the captured image by comparing the captured image obtained in step S13 with the correct image created in step S11 (step S14).

Next, the defective nozzle position candidate extraction unit 323 performs a defective nozzle position candidate extraction process for extracting the N position candidates (candidates for a position of the defective nozzle) from the positions of the plurality of nozzles provided in the printing unit 205 (step S15). Note that details of the defective nozzle position candidate extraction process will be described later. Next, the defect color identification unit 324 performs a defect color identification process for identifying a defect color (step S16). Note that details of the defect color identification process will be described later.

Next, a correction process by the first correction unit 120 is performed (step S17). The correction process includes the defect correction process, and as described above, the defect correction process is performed by sequentially setting only N nozzles which are defective nozzle candidates among the plurality of nozzles provided in the printing unit 205 as the correction target nozzles one by one. As a result, a corrected image is generated. Note that details of the correction process performed in step S17 will be described later.

Next, printing by the printing unit 205 is performed based on the corrected image generated in step S17 (step S18). Then, the print image obtained in step S18 is captured by the imaging unit 310 (step S19). Next, the defect detection unit 322 performs an inspection process for detecting a defect included in the captured image by comparing the captured image obtained in step S19 with the correct image created in step S11 (step S20).

Next, the defective nozzle identification unit 325 performs a defective nozzle identification process for identifying a defective nozzle based on the position (the position in the captured image) of the defect detected in step S20 (step S21). Note that details of the defective nozzle identification process will be described later.

Next, a correction process by the second correction unit 130 is performed (step S22). Specifically, the defect correction process is performed on the user image so as to obtain the print image from which the influence of the ejection defect of the defective nozzle identified in step S21 has been removed. As a result, the corrected user image described above is obtained. After a defective nozzle corresponding to a certain streak defect is identified in step S21, in a case where the defect correction process is performed by the first correction unit 120 to identify a defective nozzle having caused another streak defect, the corrected user image generated in step S22 is provided to the first correction unit 120. After all the defective nozzles are identified, printing is performed by the printing unit 205 based on the corrected user image generated in step S22.

In the present embodiment, the first printing step is implemented by step S12, the first imaging step is implemented by step S13, the first defect detection step is implemented by step S14, the defective nozzle position candidate extraction step is implemented by step S15, the defect color identification step is implemented by step S16, the defect correction step is implemented by step S17, the second printing step is implemented by step S18, the second imaging step is implemented by step S19, the second defect detection step is implemented by step S20, and the defective nozzle identification step is implemented by step S21.

<6.2 Defective Nozzle Position Candidate Extraction Process>

Figure 11:
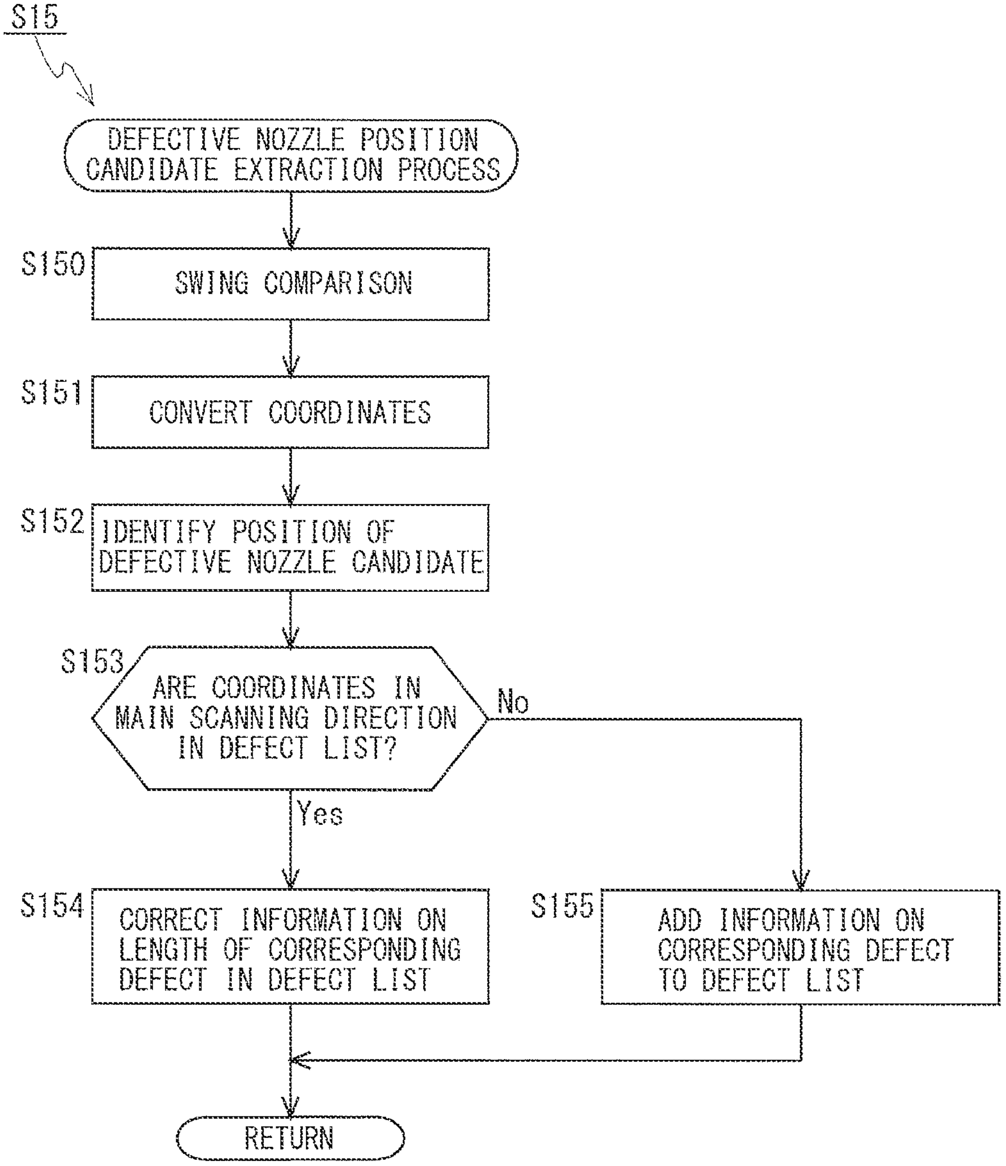
FIG. 11 is a flowchart showing a detailed procedure of a defective nozzle position candidate extraction process in the embodiment.
Figure 12:
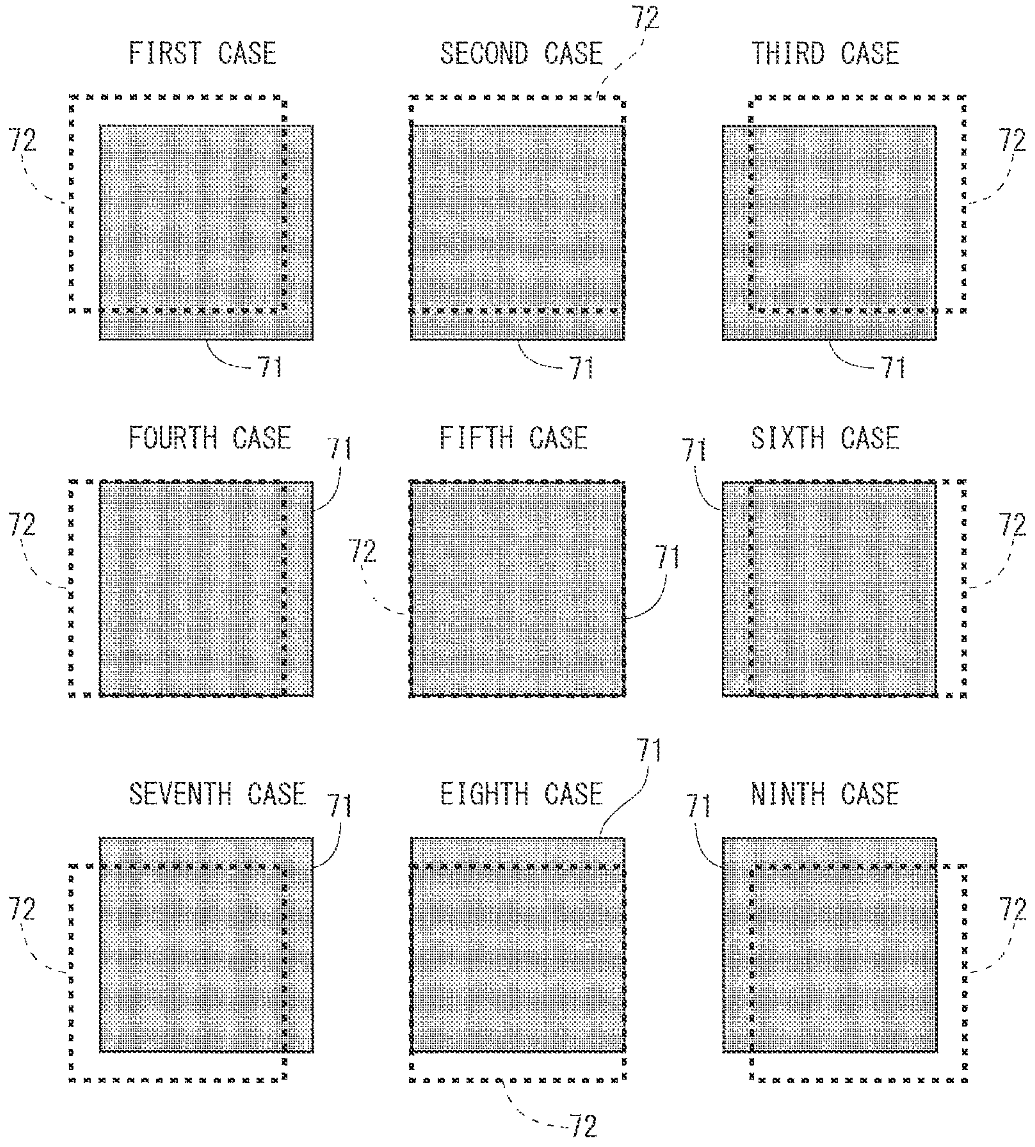
FIG. 12 is a diagram for describing swing comparison in the embodiment.

FIG. 11 is a flowchart showing a detailed procedure of the defective nozzle position candidate extraction process. After the defective nozzle position candidate extraction process is started, first, the correct image (original image) is divided into a plurality of blocks each having a predetermined range, and a process called "swing comparison" for comparing the correct image and the captured image while slightly shifting the relative positional relationship between the correct image and the captured image is performed for each block (step S150). This process is performed to align the correct image and the captured image because there is a gap in a position where printing is performed on the print paper. In step S150, for example, as shown in FIG. 12, nine cases (first to ninth cases) are prepared concerning the relative positional relationship between the correct image 71 and the captured image 72, and alignment corresponding to a case where a difference in color values (RGB values) between the correct image 71 and the captured image 72 is minimized is performed.

Next, the position (coordinates) of the defect in the captured image is converted into a position (coordinates) on the user image (step S151). Then, N position candidates are obtained as candidates for the position of the defective nozzle based on the converted coordinates (coordinates in the main scanning direction) (step S152). That is, the position of the defective nozzle candidate is identified. In this regard, for example, information that associates the coordinates in the main scanning direction on the user image with the position (coordinates in the main scanning direction) of each nozzle is held in advance, and based on this information, the position (coordinates) of the defective nozzle candidate is identified from the coordinates obtained in step S151.

After the position of the defective nozzle candidate is identified, it is determined whether or not the position (coordinates in the main scanning direction) of the defective nozzle candidate has already been held in a list (hereinafter referred to as a "defect list") that holds information on streak defects (step S153). As a result, when the coordinates in the main scanning direction are held in the defect list, the processing proceeds to step S154, and when the coordinates in the main scanning direction are not held in the defect list, the processing proceeds to step S155.

Figures 13, 14:
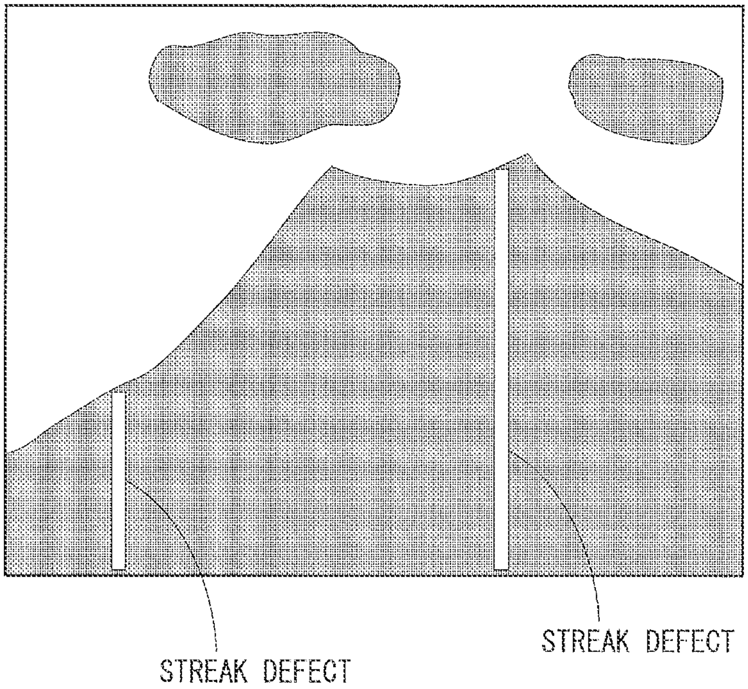
FIG. 13 is a diagram for describing a defect list in the embodiment.
FIG. 14 is a diagram for describing the defect list in the embodiment.

In step S154, the information on the length of the corresponding streak defect in the defect list is corrected. In step S155, the information on the corresponding streak defect is added to the defect list. Concerning steps S154 and S155, since the processing of step S152 is performed for each block, for example, in a case where a streak defect has occurred across two blocks, the information on the streak defect is added to the defect list during the processing of the first block, and the information on the length of the streak defect in the defect list is corrected during the processing of the second block. After step S154 or step S155 ends, the defective nozzle position candidate extraction process ends. For example, in a case in which two streak defects have occurred as shown in FIG. 13 with respect to the processing target page, the information on the two streak defects is held in the defect list as shown in FIG. 14 at the time when the defective nozzle position candidate extraction process ends.

<6.3 Defect Color Identification Process>

Figure 15:
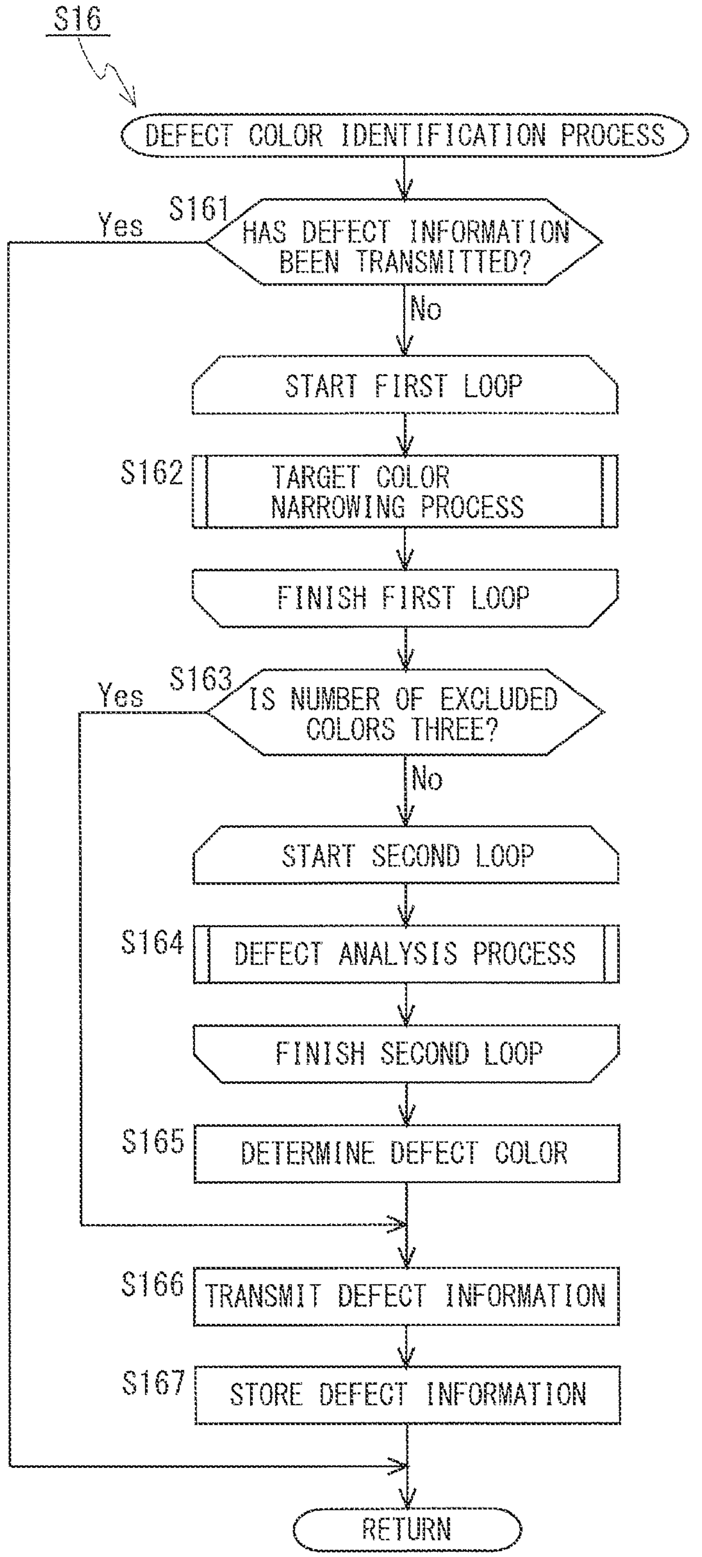
FIG. 15 is a flowchart showing a detailed procedure of a defect color identification process in the embodiment.

FIG. 15 is a flowchart showing a detailed procedure of the defect color identification process. After the defect color identification process is started, first, it is determined whether or not the defect information (the information on the position of the defective nozzle candidate and the information on the defect color) has already been transmitted to the print controller 100 (step S161). As a result, when the defect information has been transmitted to the print controller 100, the defect color identification process ends, and when the defect information has not been transmitted to the print controller 100, the processing proceeds to processing of a first loop. In this regard, for example, when similar streak defects have occurred on a first page and a second page due to one defective nozzle, the defect information is transmitted to the print controller 100 during the processing of the first page, and the defect color identification process ends without the defect information being transmitted to the print controller 100 during the processing of the second page.

Concerning the processing of the first loop, in step S162, a target color narrowing process for narrowing down the color determined as the candidate color of the defect color from among black, cyan, magenta, and yellow (a process for narrowing down the target color of processing of a second loop) is performed based on the user image and the information on the position of the defective nozzle candidate. Note that details of the target color narrowing process will be described later.

Thereafter, it is determined whether or not the colors excluded from the defect color candidates by the target color narrowing process are three colors (step S163). As a result, when the colors excluded from the defect color candidates are three colors, the processing proceeds to step S166, and when the colors excluded from the defect color candidates are not three colors, the processing proceeds to the processing of the second loop. When the colors excluded from the defect color candidates are three colors, the remaining color among black, cyan, magenta, and yellow is determined as the defect colors.

Concerning the second loop, in step S164, a defect analysis process for analyzing defects in detail based on the correct image and the captured image is performed. Note that details of the defect analysis process will be described later. After the processing of the second loop ends, the defect color is determined based on the result of the defect analysis process (step S165). In this regard, as will be described later, in the processing of the second loop, the defect color is determined for each unit region in the region corresponding to the streak defect. Then, in step S165, the color determined as the defect color most frequently in the processing of the second loop is determined as the final defect color.

In step S166, defect information is transmitted from the image inspection computer 320 to the print controller 100 based on the result of the defective nozzle position candidate extraction process described above and the result of step S165. Thereafter, the defect information is stored in the image inspection computer 320 (e.g., the auxiliary storage device 521) (step S167), and the defect color identification process ends. Note that, when the defect correction process is performed by the first correction unit 120, a nozzle that ejects ink of a color (defect color) identified by the defect color identification process is set as a correction target nozzle.

Figure 16:
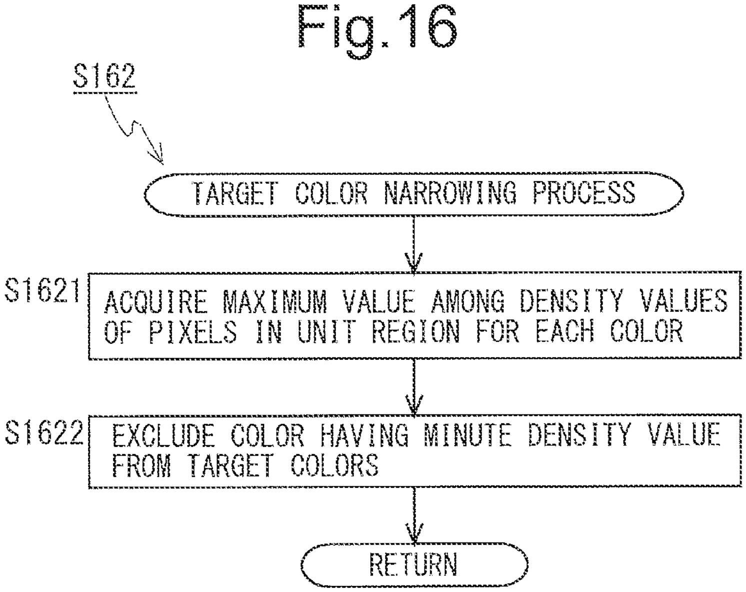
FIG. 16 is a flowchart showing a detailed procedure of a target color narrowing process in the embodiment.

FIG. 16 is a flowchart showing a detailed procedure of the target color narrowing process. Note that this target color narrowing process is a process in the first loop as shown in FIG. 15 and is thus repeated a plurality of times.

After the target color narrowing process is started, first, the maximum value among the density values of the plurality of pixels included in the unit region described below is acquired for each color of black, cyan, magenta, and yellow based on the user image and the information on the position of the defective nozzle candidate (step S1621).

Figure 17:
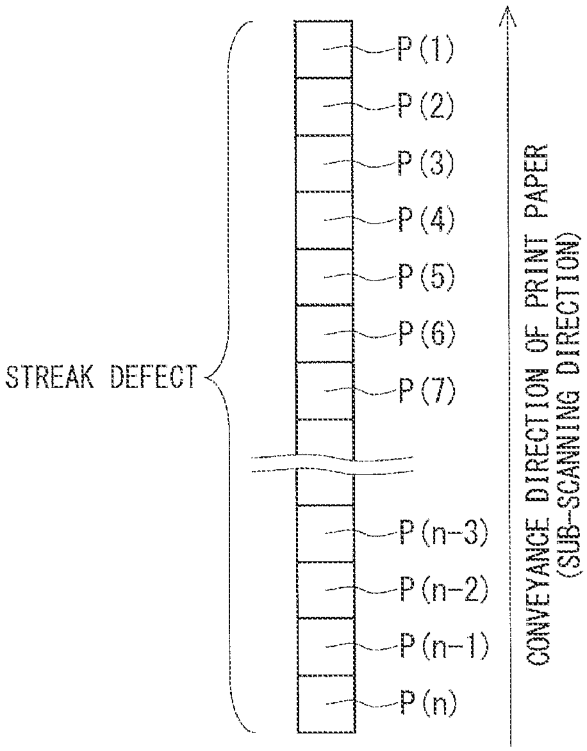
FIG. 17 is a diagram for describing a process performed for each unit region in the embodiment.

Here, the unit region will be described with reference to FIG. 17. In the present embodiment, a region constituted by a predetermined number of pixels continuous in the sub-scanning direction is treated as a unit region. For example, a region including three pixels continuous in the sub-scanning direction is treated as a unit region. In this case, when a streak defect including n pixels P(1) to P(n) has occurred as shown in FIG. 17, the pixels P(1) to P(3) are treated as a target unit region during the first processing. Then, the pixels P(2) to P(4) are treated as a target unit region in second processing, and the pixels P(3) to P(5) are treated as a target unit region during the third processing. Thereafter, during the (n−2)th processing, the pixels P(n−2) to P(n) are treated as a target unit region. In this manner, the processing of the first loop is performed while the range of pixels treated as the unit region is shifted little by little. In the above example, for example, the pixels P(3) to P(5) may be treated as a target unit region during the second processing.

From the above, in step S1621, for each of black, cyan, magenta, and yellow, for example, the maximum value among the density values of the three pixels is acquired. Therefore, in step S1621, four maximum values (maximum value for black, maximum value for cyan, maximum value for magenta, and maximum value for yellow) are acquired.

Next, each of the four maximum values acquired in step S1621 is compared with a predetermined threshold, and a color with its maximum value equal to or less than the threshold is excluded from target colors (defect color candidates) (step S1622). That is, a color having a minute density value is excluded from the target colors (defect color candidates).

From the above, the defect color is identified from colors, among the black ink, the cyan ink, the magenta ink, and the yellow ink, except for a color of an ink, the amount of which to be ejected to the position of the defect detected by the inspection process performed based on the user image is equal to or less than a predetermined threshold.

Meanwhile, as described above, the processing including step S1621 and step S1622 is repeated a plurality of times. In the example shown in FIG. 17, when n is 50, the processing including step S1621 and step S1622 is repeated 48 times. Although a color with its maximum value equal to or less than the threshold even once in the processing of step S1622 repeated a plurality of times is excluded from the target colors in the present embodiment, the present invention is not limited thereto. For example, a color with its maximum value equal to or less than the threshold at a rate equal to or more than a predetermined rate in the processing of step S1622 repeated a plurality of times may be excluded from the target colors.

Figure 18:
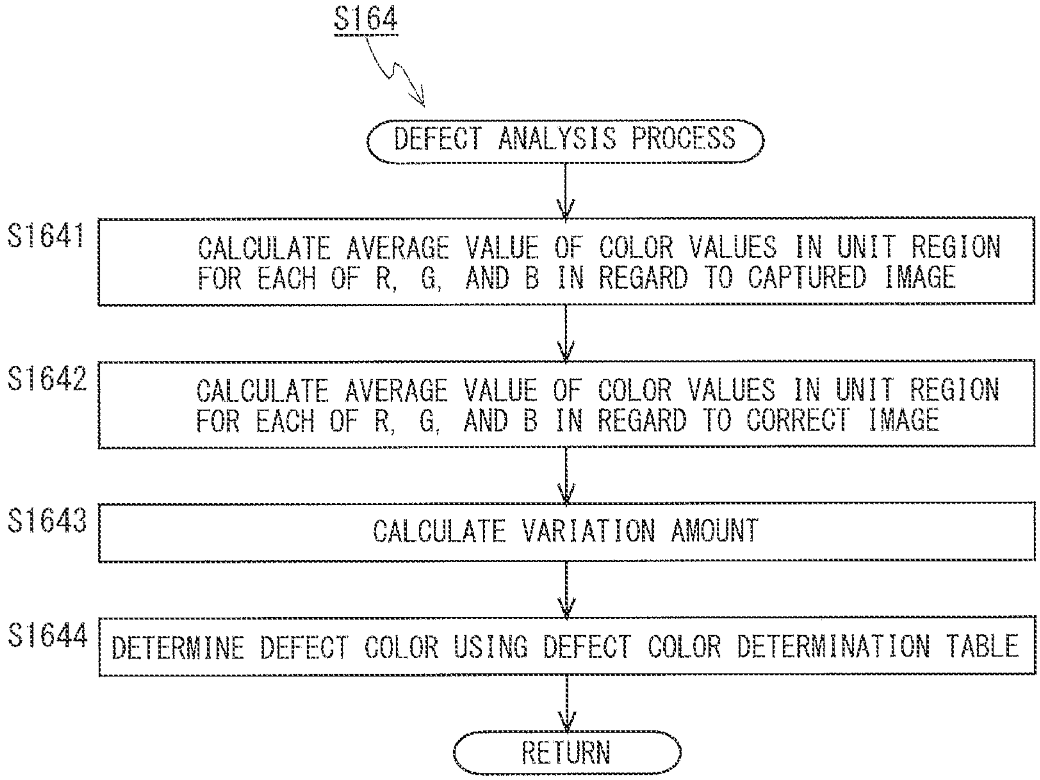
FIG. 18 is a flowchart showing a detailed procedure of a defect analysis process in the embodiment.

FIG. 18 is a flowchart showing a detailed procedure of the defect analysis process. Note that this defect analysis process is a process in the second loop as shown in FIG. 15 and is thus repeated a plurality of times. In the example shown in FIG. 17, when n is 50, this defect analysis process is repeated 48 times.

After the defect analysis process is started, first, concerning a region in which a streak defect has occurred in the captured image obtained in step S13 in FIG. 10, an average value of color values of a plurality of pixels included in a unit region is calculated for each of R (red), G (green), and B (blue) (step S1641). That is, in step S1641, the average value for R, the average value for G, and the average value for B are calculated based on the captured image.

Next, concerning a region in which a streak defect has occurred in the correct image created in step S11, an average value of color values of a plurality of pixels included in a unit region is calculated for each of R, G, and B (step S1642). That is, in step S1642, the average value for R, the average value for G, and the average value for B are calculated based on the correct image.

Next, for each of R, G, and B, a difference between the average value calculated in step S1641 and the average value calculated in step S1642 is calculated as a variation amount (step S1643).

Next, based on the variation amount of each color obtained in step S1643 and a defect color determination table prepared in advance, a defect color is determined for a unit region to be processed (step S1644). At this time, a color for which the variation amount calculated in step S1643 is equal to or larger than a predetermined threshold is treated as "variation amount: large". How to determine the defect color based on the defect color determination table will be described below.

FIG. 19 is a diagram schematically showing an example of a defect color determination table. The defect color determination table holds, for each combination of two or more colors of black, cyan, magenta, and yellow, information for identifying a color to be determined as the defect color in step S1644 from among the process colors (black, cyan, magenta, and yellow) depending on the result obtained in step S1643 for each of R, G, and B. A portion denoted by reference numeral 73 stores possible combinations of colors not excluded from the target colors in the processing of the first loop. A portion denoted by reference numeral 74 stores information corresponding to the variation amount for each of R, G, and B. A portion denoted by reference numeral 75 stores information on a color to be determined as the defect color. Note that a circle mark in the portion denoted by reference numeral 74 indicates that the corresponding color is "variation amount: large", a blank portion in the portion denoted by reference numeral 74 indicates that the corresponding color is not "variation amount: large", a hyphen in the portion denoted by reference numeral 74 indicates that there is no case where the corresponding color is "variation large", and a hyphen in the portion denoted by reference numeral 75 indicates that the corresponding case does will not appear. Furthermore, "X" in the portion denoted by reference numeral 75 indicates that the defect color should be determined assuming that only a color having the largest variation amount among a plurality of colors having "variation amount: large" is "variation amount: large".

For example, it is assumed that the defect color determination table shown in FIG. 19 is prepared and no color was excluded from the target colors (defect color candidates) in the processing of the first loop. In this case, the target colors are four colors of cyan (C), magenta (M), yellow (Y), and black (K). At this time, when all of R, G, and B are "variation amount: large", black (K) is determined as the defect color with reference to a portion indicated by an arrow denoted by reference numeral 76.

Furthermore, for example, it is assumed that the defect color determination table shown in FIG. 19 is prepared and that black (K) was excluded from the target colors (defect color candidates) in the processing of the first loop. In this case, the target colors are three colors of cyan (C), magenta (M), and yellow (Y). At this time, when only G is "variation amount: large", magenta (M) is determined as the defect color by referring to a portion indicated by an arrow denoted by reference numeral 77.

Further, for example, it is assumed that the defect color determination table shown in FIG. 19 is prepared and that no color was excluded from the target colors (defect color candidates) in the processing of the first loop. In this case, the target colors are four colors of cyan (C), magenta (M), yellow (Y), and black (K). At this time, when G and B are "variation amount: large", and the variation amount of G is larger than that of B, magenta (M) is determined as the defect color by referring to a portion indicated by an arrow denoted by reference numeral 78 and a portion indicated by an arrow denoted by reference numeral 79.

As above, in step S1644, the defect color is determined using the defect color determination table. The defect analysis process is repeated a plurality of times. Therefore, the number of determination results (defect color determination results) equal to the number of times the defect analysis process is repeated is obtained. Then, as described above, in step S165 of FIG. 15, the color determined as the defect color most frequently in step S1644 is determined as the final defect color.

<6.4 Correction Process>

Figure 20:
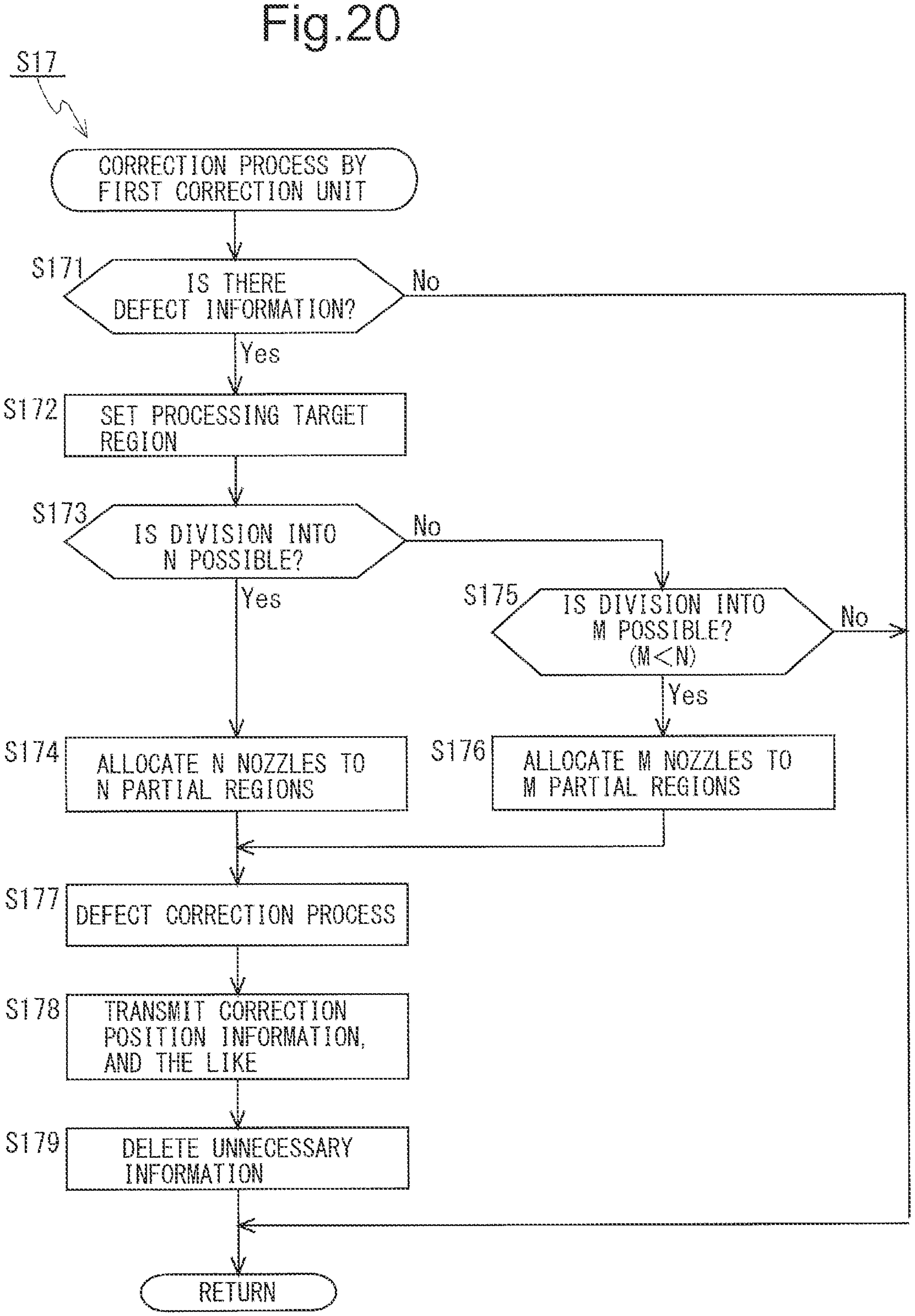
FIG. 20 is a flowchart showing a detailed procedure of a correction process performed by a first correction unit in the embodiment.

FIG. 20 is a flowchart showing a detailed procedure of the correction process performed by the first correction unit 120. After the correction process is started, first, it is determined whether or not there is defect information (the information on the position of the defective nozzle candidate and the information on the defect color) concerning the processing target page (step S171). As a result, when there is defect information, the processing proceeds to step S172, and when there is no defect information, the correction process ends.

In step S172, for the processing target page, a region in which the density value of the defect color satisfies a predetermined condition in the region corresponding to the position candidate (candidate for the position of the defective nozzle) extracted in the defective nozzle position candidate extraction process is set as the processing target region (step S172). In this regard, a region in which the ink of the defect color has been applied at such a density that it can be determined whether or not the effect of correction for removing the influence of the ejection defect of the nozzle has been obtained from the corrected image is set as the processing target region.

Next, it is determined whether or not the size of each partial region obtained by dividing the processing target region set in step S172 into N (the number of defective nozzle candidates) regions is equal to or larger than the size of a region (hereinafter referred to as a "minimum inspectable region") required for the image inspection computer 320 to detect a defect (step S173). As a result, when the size of each partial region is equal to or larger than the size of the minimum inspectable region, the processing proceeds to step S174, and when the size of each partial region is not equal to or larger than the size of the minimum inspectable region, the processing proceeds to step S175. Note that the size of the minimum inspectable region depends on the capability of the image inspection computer 320.

In step S174, the N defective nozzle candidates are associated with N partial regions obtained by dividing the processing target region into N regions. In this manner, the N defective nozzle candidates and the N partial regions are associated on a one-to-one basis.

In step S175, it is determined whether or not the processing target region can be divided into M (M is an integer less than N) partial regions such that the size of each divided partial region is equal to or larger than the size of the minimum inspectable region. As a result, when the division is possible, the processing proceeds to step S176, and when the division is not possible, the correction process ends.

In step S176, M nozzles among the N nozzles regarded as defective nozzle candidates are associated with M partial regions obtained by dividing the processing target region into M regions.

After step S174 or step S176 end, the defect correction process is performed on the user image (step S177). At that time, when the N defective nozzle candidates are associated with the N partial regions in step S174, the defect correction process is performed while setting a different nozzle among the N nozzles (nozzles regarded as defective nozzle candidates) as the correction target nozzle for each of the N partial regions. On the other hand, when the M defective nozzle candidates are associated with the M partial regions in step S176, the defect correction process is performed while setting a different nozzle of the M nozzles (nozzles regarded as defective nozzle candidates) as the correction target nozzle for each of the M partial regions.

Next, correction position information (information indicating which nozzle has been set as the correction target nozzle at which position (region) in performing the defect correction process) is transmitted from the print controller 100 to the image inspection computer 320 (step S178). Thereafter, unnecessary defect information and the like are deleted (step S179). Thus, the correction process by the first correction unit 120 ends.

In the present embodiment, the association step is achieved by steps S173 to S176. In this regard, in steps S173 to S176, in a case in which each partial region has a size equal to or larger than the size of the minimum inspectable region when the processing target region in one page is divided into N partial regions, the association unit 122 associates the N nozzles with the N partial regions obtained by dividing the processing target region in one page into N regions. In a case in which each partial region has a size smaller than the size of the minimum inspectable region when the processing target region in one page is divided into N partial regions, the association unit 122 divides the processing target region in one page into M (M is an integer less than N) partial regions within a range in which the size of each partial region after division is equal to or larger than the size of the minimum inspectable region and associates M nozzles among the N nozzles with the M partial regions.

Hereinafter, the association (association between the partial region and the nozzle) performed in this correction process will be described. It is assumed here that four nozzles are extracted as defective nozzle candidates, and these four nozzles are referred to as a “first nozzle”, a “second nozzle”, a “third nozzle”, and a “fourth nozzle”.

In a case in which the streak defect 60 shown in FIG. 6 has occurred in the image of one page and the region corresponding to the streak defect 60 is set as the processing target region in step S172, it is assumed that the size of each of the partial regions (partial regions 61 to 64 in FIG. 7) obtained by dividing the processing target region into four regions is equal to or larger than the size of the minimum inspectable region. At this time, for example, the partial region 61 and the first nozzle are associated, the partial region 62 and the second nozzle are associated, the partial region 63 and the third nozzle are associated, and the partial region 64 and the fourth nozzle are associated. Then, in step S177 described above, the defect correction process is performed with the first nozzle set as the correction target nozzle for the partial region 61, the defect correction process is performed with the second nozzle set as the correction target nozzle for the partial region 62, the defect correction process is performed with the third nozzle set as the correction target nozzle for the partial region 63, and the defect correction process is performed with the fourth nozzle set as the correction target nozzle for the partial region 64.

Figure 21:
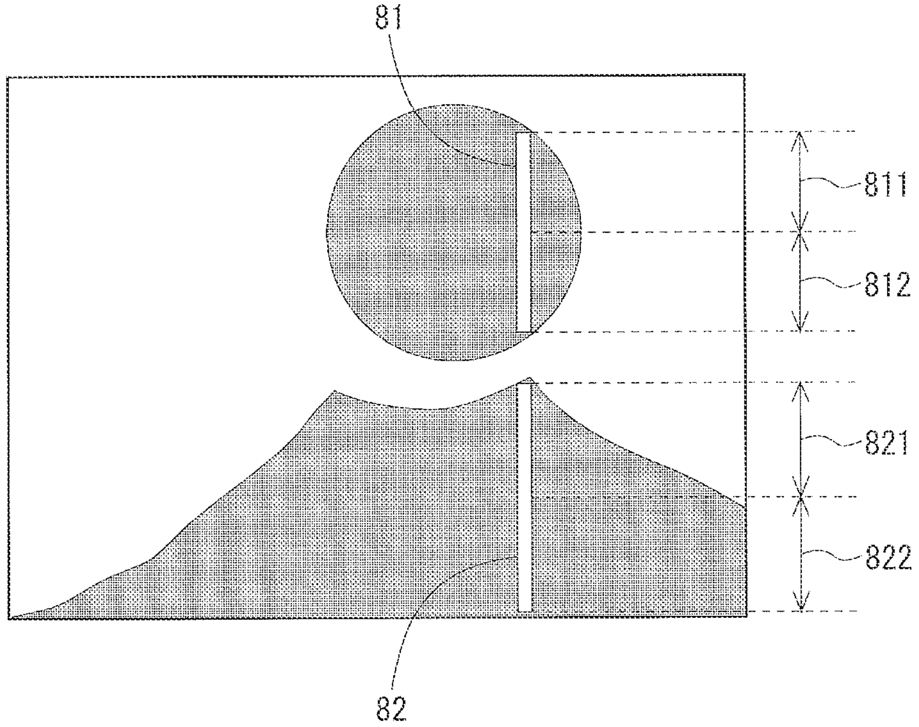
FIG. 21 is a diagram for describing association between a partial region and a nozzle in the embodiment.

In a case in which a streak defect denoted by reference numeral 81 and a streak defect denoted by reference numeral 82 have occurred in an image of one page as shown in FIG. 21 and regions corresponding to the streak defects 81, 82 are set as the processing target region in step S172, it is assumed that the size of each of partial regions (partial regions 811, 812, 821, and 822 in FIG. 21) obtained by dividing the processing target region into four regions is equal to or larger than the size of the minimum inspectable region. At this time, for example, the partial region 811 and the first nozzle are associated, the partial region 812 and the second nozzle are associated, the partial region 821 and the third nozzle are associated, and the partial region 822 and the fourth nozzle are associated. Then, in step S177 described above, the defect correction process is performed with the first nozzle set as the correction target nozzle for the partial region 811, the defect correction process is performed with the second nozzle set as the correction target nozzle for the partial region 812, the defect correction process is performed with the third nozzle set as the correction target nozzle for the partial region 821, and the defect correction process is performed with the fourth nozzle set as the correction target nozzle for the partial region 822.

Figure 22:
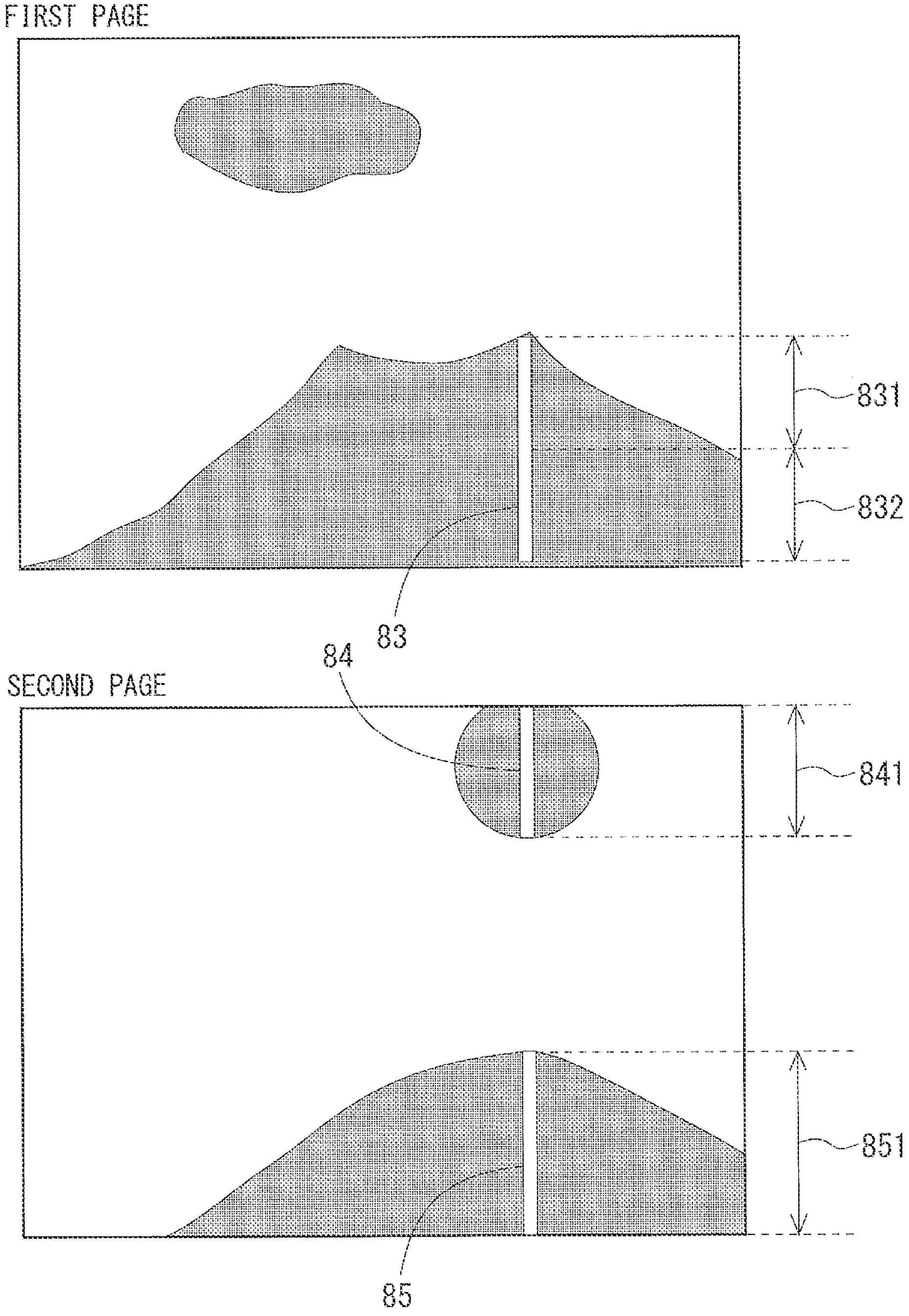
FIG. 22 is a diagram for describing association between a partial region and a nozzle in the embodiment.

It is assumed that, as shown in FIG. 22, a streak defect denoted by reference numeral 83 has occurred on a first page, and a streak defect denoted by reference numeral 84 and a streak defect denoted by reference numeral 85 have occurred on a second page. Further, in a case in which the regions corresponding to the streak defects 83, 84, and 85 are set as the processing target regions in step S172, it is assumed that the size of each of the partial regions (partial region 831 and 832 in FIG. 22) obtained by dividing the processing target region corresponding to the streak defect 83 into two regions, the size of the processing target region 841 corresponding to the streak defect 84, and the size of the processing target region 851 corresponding to the streak defect 85 are each equal to or larger than the size of the minimum inspectable region. It is assumed that the size of each partial region obtained by dividing the processing target region corresponding to the streak defect 83 into three regions, the size of each partial region obtained by dividing the processing target region 841 corresponding to the streak defect 84 into two regions, and the size of each partial region obtained by dividing the processing target region 851 corresponding to the streak defect 85 into two regions are each smaller than the size of the minimum inspectable region. At this time, for example, the partial region 831 and the first nozzle are associated, the partial region 832 and the second nozzle are associated, the processing target region 841 and the third nozzle are associated, and the processing target region 851 and the fourth nozzle are associated. Then, in step S177 described above, the defect correction process is performed with the first nozzle set as the correction target nozzle for the partial region 831, the defect correction process is performed with the second nozzle set as the correction target nozzle for the partial region 832, the defect correction process is performed with the third nozzle set as the correction target nozzle for the processing target region 841, and the defect correction process is performed with the fourth nozzle set as the correction target nozzle for the processing target region 851. In this example, the processing target regions 841 and 851 are treated as partial regions.

Figure 23:
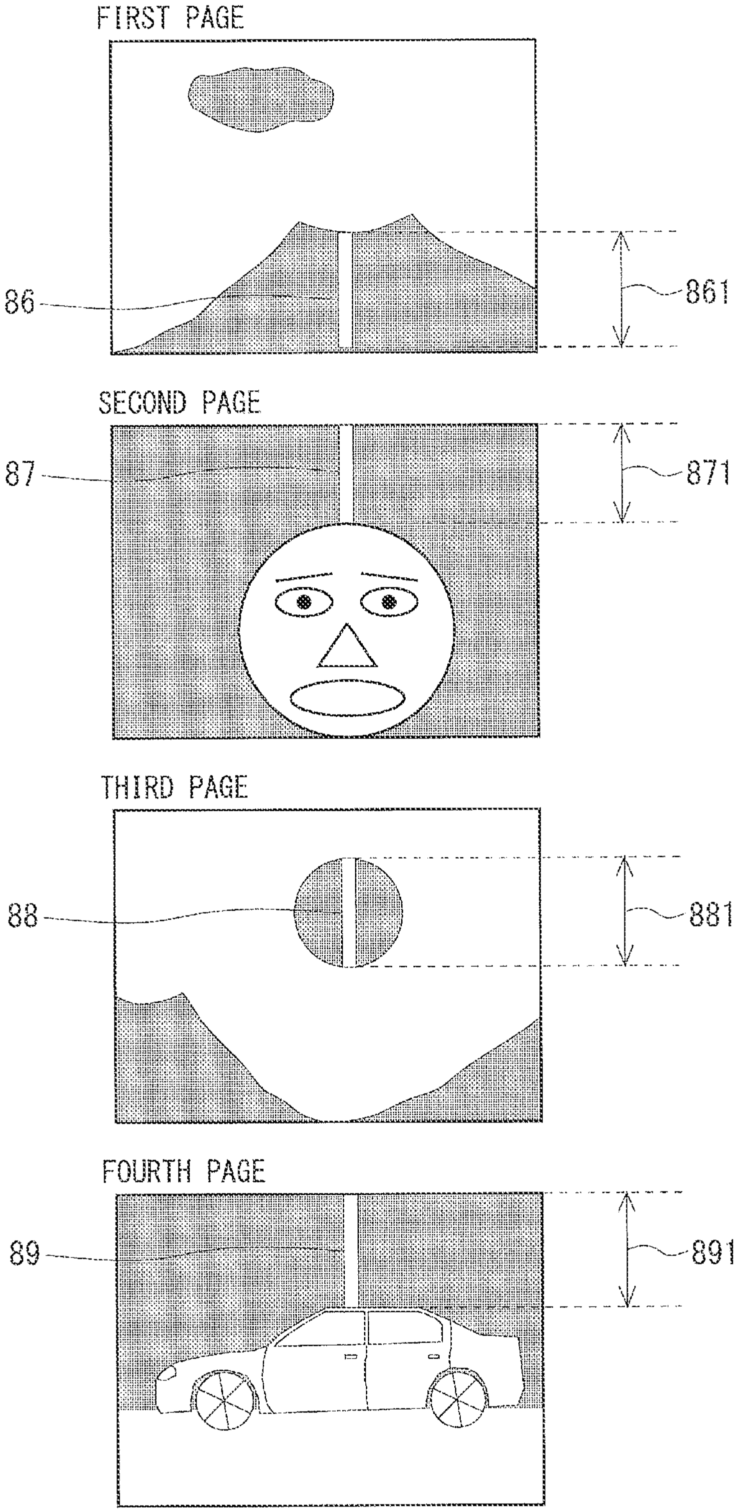
FIG. 23 is a diagram for describing association between a partial region and a nozzle in the embodiment.

It is assumed that, as shown in FIG. 23, a streak defect denoted by reference numeral 86 has occurred on a first page, a streak defect denoted by reference numeral 87 has occurred on a second page, a streak defect denoted by reference numeral 88 has occurred on a third page, and a streak defect denoted by reference numeral 89 has occurred on a fourth page. In a case in which the regions corresponding to the streak defects 86, 87, 88, and 89 are set as the processing target regions in step S172, it is assumed that the size of the processing target region 861 corresponding to the streak defect 86, the size of the processing target region 871 corresponding to the streak defect 87, the size of the processing target region 881 corresponding to the streak defect 88, and the size of the processing target region 891 corresponding to the streak defect 89 are each equal to or larger than the size of the minimum inspectable region. It is assumed that the size of each partial region obtained by dividing the processing target region 861 corresponding to the streak defect 86 into two regions, the size of each partial region obtained by dividing the processing target region 871 corresponding to the streak defect 87 into two regions, the size of each partial region obtained by dividing the processing target region 881 corresponding to the streak defect 88 into two regions, and the size of each partial region obtained by dividing the processing target region 891 corresponding to the streak defect 89 into two regions are each smaller than the size of the minimum inspectable region. At this time, for example, the processing target region 861 and the first nozzle are associated, the processing target region 871 and the second nozzle are associated, the processing target region 881 and the third nozzle are associated, and the processing target region 891 and the fourth nozzle are associated. Then, in step S177 described above, the defect correction process is performed with the first nozzle set as the correction target nozzle for the processing target region 861, the defect correction process is performed with the second nozzle set as the correction target nozzle for the processing target region 871, the defect correction process is performed with the third nozzle set as the correction target nozzle for the processing target region 881, and the defect correction process is performed with the fourth nozzle set as the correction target nozzle for the processing target region 891. In this example, the processing target regions 861, 871, 881, and 891 are treated as partial regions.

In each of the examples shown in FIGS. 22 and 23, the user image is an image of two or more pages, and the association unit 122 disperses four partial regions into a plurality of pages and associates four nozzles, which are defective nozzle candidates, with the four partial regions.

<6.5 Defective Nozzle Identification Process>

Figure 24:
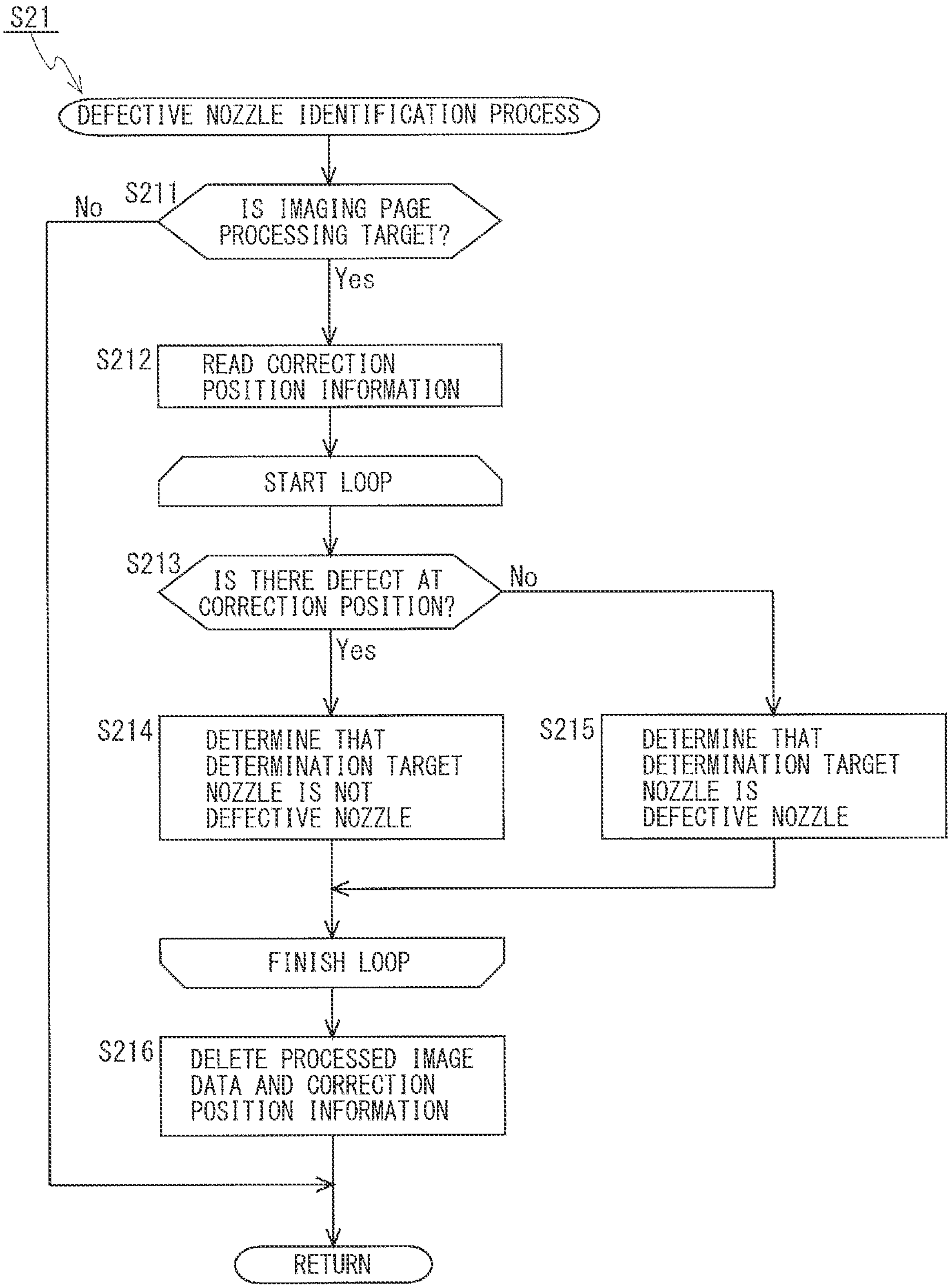
FIG. 24 is a flowchart showing a detailed procedure of a defective nozzle identification process in the embodiment.

FIG. 24 is a flowchart showing a detailed procedure of the defective nozzle identification process. After the defective nozzle identification process is started, first, it is determined whether or not an imaging page (captured image) provided is a processing target (step S211). As a result, when the imaging page is the processing target, the processing proceeds to step S212, and when the imaging page is not the processing target, the defective nozzle identification process ends. Note that, for example, in a case where the imaging page does not include any defect, it is determined that the imaging page is not the processing target.

Next, the correction position information transmitted from the print controller 100 to the image inspection computer 320 in step S178 in FIG. 20 is read (step S212). Then, the process for determining whether or not the determination target nozzle is a defective nozzle is repeated by the number of nozzles corresponding to the correction position information. In step S213, based on the correction position information and the result of the inspection process performed in step S20 in FIG. 10, it is determined whether or not there is a defect at the position (correction position) where the defect correction process has been performed with the determination target nozzle set as the correction target nozzle. As a result, when there is a defect in the correction position, the processing proceeds to step S214, and when there is no defect in the correction position, the processing proceeds to step S215. In step S214, it is determined that the determination target nozzle is not a defective nozzle. In step S215, it is determined that the determination target nozzle is a defective nozzle.

Figure 7:
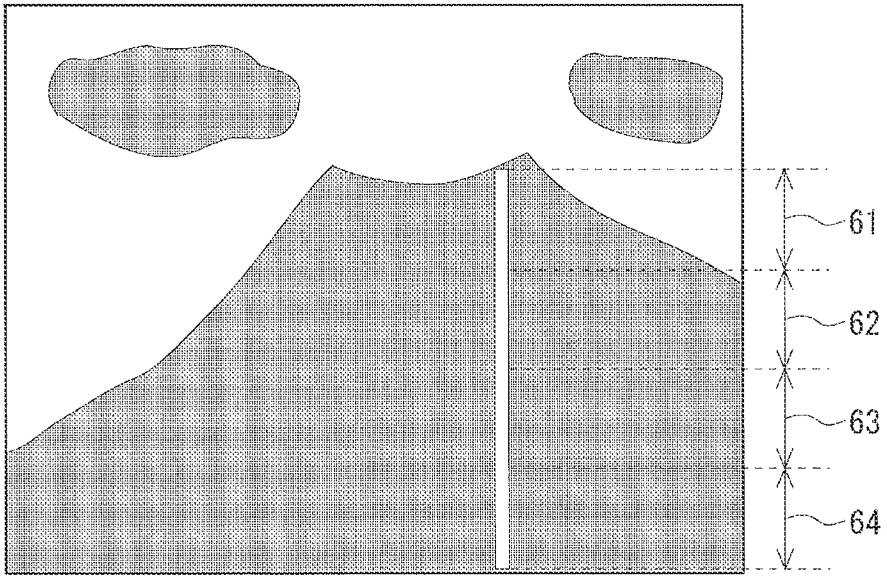
FIG. 7 is a diagram for describing the outline of identification of the defective nozzle in the embodiment.
Figure 8:
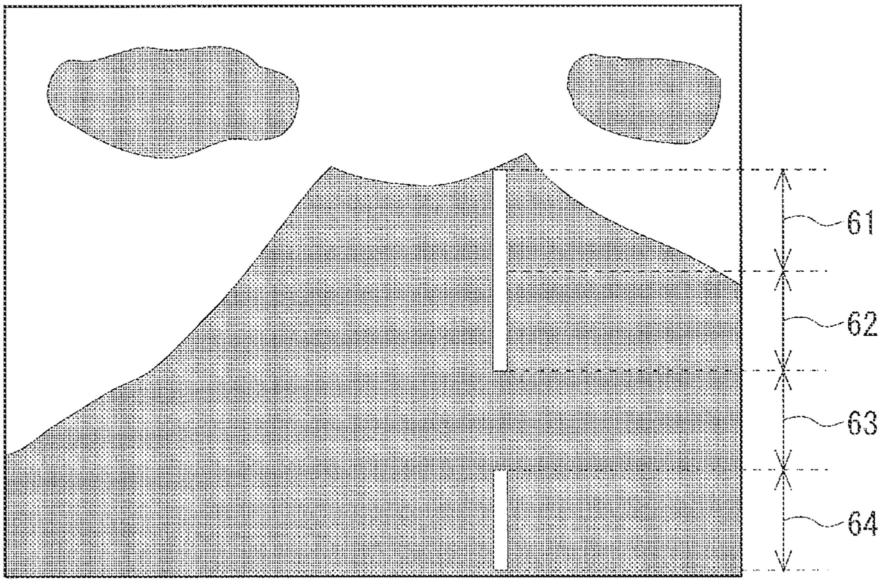
FIG. 8 is a diagram for describing the outline of identification of the defective nozzle in the embodiment.

In each of the examples shown in FIGS. 6 to 8, the process for determining whether or not the determination target nozzle is a defective nozzle (Processing of a loop in FIG. 24) is repeated four times. Since there is a defect in the partial region 61 (cf. FIG. 8), it is determined that the first nozzle set as the correction target nozzle for the partial region 61 at the time of the defect correction process is not a defective nozzle. Similarly, since there is a defect in each of the partial region 62 and the partial region 64, it is determined that the second nozzle and the fourth nozzle are not defective nozzles. On the other hand, since there is no defect in the partial region 63, it is determined the third nozzle set as the correction target nozzle for the partial region 63 at the time of the defect correction process is a defective nozzle. In this manner, the nozzle associated with the partial region in which the defect is not detected by the inspection process performed based on the corrected image among the four partial regions is identified as the defective nozzle.

After it is determined whether or not each of all the nozzles corresponding to the correction position information is a defective nozzle, the processed image data (the data of the user image transmitted from the print controller 100 to the image inspection computer 320) and the correction position information are deleted (step S216). Thus, the defective nozzle identification process ends.

<7 Effects>

According to the present embodiment, N position candidates are extracted as candidates for the position of the defective nozzle on the basis of the position of the defect detected in the inspection process based on the captured image obtained by capturing the user image (print image). Then, the defect correction process is performed while sequentially setting only the N nozzles respectively corresponding to the N position candidates one by one as the correction target nozzles. Thereafter, the defective nozzle is identified on the basis of the position of the defect detected by the inspection process based on the captured image obtained by the capturing of the image (corrected image) after the defect correction process. As above, only the N (e.g., four) nozzles respectively corresponding to the N position candidates among the plurality of nozzles provided in the printing system are set as the correction target nozzles at the time of the defect correction process. In addition, there is no need to print a special image such as a nozzle check pattern. From the above, according to the present embodiment, a printing system and a defective nozzle detection method capable of efficiently detecting a defective nozzle from a large number of nozzles are achieved.

<8. Modification>

In the above embodiment, the inkjet printer 10 that performs color printing has been adopted. However, the present invention is not limited thereto, and an inkjet printer that performs monochrome printing may be adopted. In this case, the defect color identification unit 324 (cf. FIG. 9) in the image inspection computer 320 is unnecessary, and the defective nozzle is identified from among the plurality of nozzles included in the print head that ejects the black ink without performing a process of identifying the defect color.

In the above embodiment, the configuration in which the present invention is applied to the inkjet printer 10 including the print heads (ink ejection units) 25K, 25C, 25M, and 25Y of four colors of black (K), cyan (C), magenta (M), and yellow (Y) has been described. However, the present invention is not limited thereto, and even when the present invention is applied to a printer that performs printing using print heads of five or more colors, a defect color can be identified by performing a process similar to the defect color identification process described above.

Furthermore, in the embodiment described above, the inkjet printer 10 using aqueous ink has been adopted. However, the present invention is not limited thereto, and for example, an inkjet printer using ultraviolet (UV) ink (ultraviolet curing ink) such as an inkjet printer for label printing may be adopted. In this case, an ultraviolet irradiation unit that cures the UV ink on the print paper PA by ultraviolet irradiation is provided inside the printing mechanism 201 (cf. FIG. 2) instead of the drying unit 206.

Although the present invention has been described in detail above, the above description is illustrative in all aspects and is not restrictive. It is understood that numerous other modifications and variations can be devised without departing from the scope of the present invention.

This application is an application claiming priority based on Japanese Patent Application No. 2022-34059 entitled "Printing System and Defective Nozzle Detection Method" filed on Mar. 7, 2022, and the contents of which are herein incorporated by reference.

What is claimed is:

1. A printing system comprising:

a conveyance mechanism for conveying a print medium;

a printing unit that has a plurality of nozzles and is configured to perform printing on the print medium by ejecting ink from each of the plurality of nozzles, the plurality of nozzles being arranged in a main scanning direction that is perpendicular to a direction in which the conveyance mechanism conveys the print medium;

an imaging unit configured to capture a print image printed on the print medium by the printing unit;

a defect detection unit configured to perform an inspection process for detecting a streak defect included in a captured image obtained by capturing the print image by the imaging unit;

a defective nozzle position candidate extraction unit configured to extract N position candidates, N being an integer of 2 or more, from positions of the plurality of nozzles as candidates for a position of a defective nozzle that is a nozzle having an ejection defect, based on coordinates in the main scanning direction of the streak defect detected by the inspection process in the captured image, the N position candidates having different positions with respect to the main scanning direction;

a defect correction unit configured to perform, on a user image, a defect correction process for removing an influence of an ejection defect of a nozzle set as a correction target nozzle to generate a corrected image, the user image being an image to be printed; and a defective nozzle identification unit configured to identify the defective nozzle from N nozzles respectively corresponding to the N position candidates, wherein after the printing by the printing unit, the capturing of the print image by the imaging unit, and the inspection process by the defect detection unit are performed based on the user image, the N position candidates are extracted by the defective nozzle position candidate extraction unit, the defect correction unit performs the defect correction process while sequentially setting each of only the N nozzles among the plurality of nozzles as the correction target nozzle one by one, after the corrected image is generated by the defect correction unit, the printing by the printing unit, the capturing of the print image by the imaging unit, and the inspection process by the defect detection unit are performed based on the corrected image, the defective nozzle identification unit identifies the defective nozzle based on a position of the streak defect detected by the inspection process performed based on the corrected image, in the captured image, the defect correction unit includes an association unit that associates the N nozzles with N partial regions included in the user image, the N partial regions having same positions with respect to the main scanning direction, each of the N partial regions includes the position of the streak defect detected by the inspection process performed based on the user image, the defect correction unit performs the defect correction process while setting a different nozzle among the N nozzles as the correction target nozzle for each of the N partial regions, and the defective nozzle identification unit identifies, as the defective nozzle, a nozzle associated with a partial region in which no streak defect is detected by the inspection process performed based on the corrected image, among the N partial regions.

2. The printing system according to claim 1, wherein the printing unit includes a plurality of ink ejection units that eject inks of different colors from nozzles, the printing system further comprises a defect color identification unit configured to identify a color of ink ejected by an ink ejection unit that includes the defective nozzle among the plurality of ink ejection units, and when performing the defect correction process, the defect correction unit sets, as the correction target nozzle, a nozzle that ejects ink of a defect color being the color identified by the defect color identification unit.

3. The printing system according to claim 2, wherein the plurality of ink ejection units includes a black ink ejection unit that ejects a black ink, a cyan ink ejection unit that ejects a cyan ink, a magenta ink ejection unit that ejects a magenta ink, and a yellow ink ejection unit that ejects a yellow ink, and the defect color identification unit identifies the defect color from colors except for a color of an ink, the amount of which to be ejected to the position of the streak defect detected by the inspection process performed based on the user image is equal to or less than a predetermined threshold, among the black ink, the cyan ink, the magenta ink, and the yellow ink.

4. The printing system according to claim 2, wherein the defect color identification unit identifies the defect color based on a difference in average values of red color values, a difference in average values of green color values, and a difference in average values of blue color values, in a region where a streak defect is detected by the inspection process performed based on the user image, between the captured image based on the user image and a correct image corresponding to the user image.

5. The printing system according to claim 2, wherein the association unit sets, as a processing target region, a region in which a density value of the defect color satisfies a predetermined condition among regions corresponding to the N position candidates, and the association unit associates the N nozzles with the N partial regions in the processing target region.

6. The printing system according to claim 5, wherein in a case in which each partial region has a size equal to or larger than a size of a region required for detection of a streak defect by the inspection process when the processing target region in one page is divided into N partial regions, the association unit associates the N nozzles with the N partial regions obtained by dividing the processing target region in the one page into N regions, and in a case in which each partial region has a size smaller than the size of the region required for detection of a streak defect by the inspection process when the processing target region in one page is divided into N partial regions, the association unit divides the processing target region in the one page into M partial regions, M being an integer less than N, within a range in which a size of each partial region after division is equal to or larger than the size of the region required for detection of a streak defect by the inspection process, and the association unit associates M nozzles among the N nozzles with the M partial regions.

7. The printing system according to claim 1, wherein the user image is an image of two or more pages, and the association unit disperses the N partial regions into a plurality of pages and associates the N nozzles with the N partial regions.

8. The printing system according to claim 7, wherein a size of each of the N partial regions is equal to or larger than a size of a region required for detection of a streak defect by the inspection process.

9. The printing system according to claim 1, wherein the defective nozzle position candidate extraction unit converts coordinates in the main scanning direction, in the captured image, of the defect detected by the inspection process performed based on the user image into coordinates in the main scanning direction on the user image and extracts the N position candidates from the positions of the plurality of nozzles based on converted coordinates.

10. A defective nozzle detection method in a printing system including a conveyance mechanism for conveying a print medium, a printing unit that has a plurality of nozzles and performs printing on the print medium by ejecting ink from each of the plurality of nozzles, and an imaging unit that captures a print image printed on the print medium by the printing unit, the plurality of nozzles being arranged in a main scanning direction that is perpendicular to a direction in which the conveyance mechanism conveys the print medium, the defective nozzle detection method comprising:

a first printing step of printing a user image by the printing unit;

a first imaging step of imaging a print image obtained in the first printing step;

a first defect detection step of detecting a streak defect included in a first captured image obtained in the first imaging step;

a defective nozzle position candidate extraction step of extracting N position candidates, N being an integer of 2 or more, from positions of the plurality of nozzles as candidates for a position of a defective nozzle that is a nozzle having an ejection defect, based on coordinates in the main scanning direction of the streak defect detected in the first defect detection step in the first captured image, the N position candidates having different positions with respect to the main scanning direction;

a defect correction step of performing, on the user image, a defect correction process for removing an influence of an ejection defect of a nozzle set as a correction target nozzle to generate a corrected image;

a second printing step of printing the corrected image by the printing unit;

a second imaging step of imaging a print image obtained in the second printing step;

a second defect detection step of detecting a streak defect included in a second captured image obtained in the second imaging step; and a defective nozzle identification step of identifying the defective nozzle from N nozzles respectively corresponding to the N position candidates based on a position of the streak defect detected in the second defect detection step in the second captured image, wherein in the defect correction step, the defect correction process is performed while sequentially setting each of only the N nozzles among the plurality of nozzles as the correction target nozzle one by one, the defect correction step includes an association step of associating the N nozzles with N partial regions included in the user image, the N partial regions having same positions with respect to the main scanning direction, each of the N partial regions includes a position of a streak defect detected in the first defect detection step, in the defect correction step, the defect correction process is performed while setting a different nozzle among the N nozzles as the correction target nozzle for each of the N partial regions, and in the defective nozzle identification step, a nozzle associated with a partial region in which no streak defect is detected in the second defect detection step, among the N partial regions, is specified as the defective nozzle.

11. The defective nozzle detection method according to claim 10, wherein the printing unit includes a plurality of ink ejection units that eject inks of different colors from nozzles, the defective nozzle detection method further comprises a defect color identification step of identifying a color of ink ejected by an ink ejection unit that includes the defective nozzle among the plurality of ink ejection units, and in the defect correction step, when the defect correction process is performed, a nozzle that ejects ink of a defect color being the color identified in the defect color identification step is set as the correction target nozzle.

12. The defective nozzle detection method according to claim 11, wherein the plurality of ink ejection units includes a black ink ejection unit that ejects a black ink, a cyan ink ejection unit that ejects a cyan ink, a magenta ink ejection unit that ejects a magenta ink, and a yellow ink ejection unit that ejects a yellow ink, and in the defect color identification step, the defect color is identified from colors except for a color of an ink, the amount of which to be ejected to the position of the streak defect detected in the first defect detection step is equal to or less than a predetermined threshold, among the black ink, the cyan ink, the magenta ink, and the yellow ink.

13. The defective nozzle detection method according to claim 11, wherein, in the defect color identification step, the defect color is identified based on a difference in average values of red color values, a difference in average values of green color values, and a difference in average values of blue color values, in a region where a streak defect is detected in the first defect detection step, between the captured image based on the user image and a correct image corresponding to the user image.

14. The defective nozzle detection method according to claim 11, wherein, in the association step, a region in which a density value of the defect color satisfies a predetermined condition among regions corresponding to the N position candidates is set as a processing target region, and the N nozzles are associated with the N partial regions in the processing target region.

15. The defective nozzle detection method according to claim 14, wherein, in the association step, in a case in which each partial region has a size equal to or larger than a size of a region required for detection of a streak defect in the second defect detection step when the processing target region in one page is divided into N partial regions, the N nozzles is associated with the N partial regions obtained by dividing the processing target region in the one page into N regions, and in a case in which each partial region has a size smaller than the size of the region required for detection of a streak defect in the second defect detection step when the processing target region in one page is divided into N partial regions, the processing target region in the one page is divided into M partial regions, M being an integer less than N, within a range in which a size of each partial region after division is equal to or larger than the size of the region required for detection of a streak defect in the second defect detection step, and M nozzles among the N nozzles are associated with the M partial regions.

16. The defective nozzle detection method according to claim 10, wherein the user image is an image of two or more pages, and in the association step, the N partial regions are dispersed into a plurality of pages, and the N nozzles are associated with the N partial regions.

17. The defective nozzle detection method according to claim 16, wherein a size of each of the N partial regions is equal to or larger than a size of a region required for detection of a streak defect in the second defect detection step.

18. The defective nozzle detection method according to claim 10, wherein, in the defective nozzle position candidate extraction step, coordinates in the main scanning direction, in the first captured image, of the streak defect detected in the first defect detection step are converted into coordinates in the main scanning direction on the user image, and the N position candidates are extracted from the positions of the plurality of nozzles based on converted coordinates.

19. The printing system according to claim 1, wherein the printing unit is configured to perform printing of the print image at first resolution, and the imaging unit is configured to capture the print image at second resolution lower than the first resolution.

20. The defective nozzle detection method according to claim 10, wherein the printing unit is configured to perform printing of the print image at first resolution, and the imaging unit is configured to capture the print image at second resolution lower than the first resolution.

* * * * *